United States Patent
Dong et al.

(10) Patent No.: US 11,307,985 B2
(45) Date of Patent: Apr. 19, 2022

(54) METHOD AND APPARATUS TO USE DRAM AS A CACHE FOR SLOW BYTE-ADDRESSIBLE MEMORY FOR EFFICIENT CLOUD APPLICATIONS

(71) Applicant: Intel Corporation, Santa Clara, CA (US)

(72) Inventors: Yao Zu Dong, Shanghai (CN); Kun Tian, Shanghai (CN); Fengguang Wu, Yunnan (CN); Jingqi Liu, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/255,886

(22) PCT Filed: Sep. 28, 2018

(86) PCT No.: PCT/CN2018/108206
§ 371 (c)(1),
(2) Date: Dec. 23, 2020

(87) PCT Pub. No.: WO2020/061989
PCT Pub. Date: Apr. 2, 2020

(65) Prior Publication Data
US 2021/0365371 A1 Nov. 25, 2021

(51) Int. Cl.
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/0647* (2013.01); *G06F 3/0667* (2013.01); *G06F 3/0673* (2013.01); *G06F 2212/651* (2013.01)

(58) Field of Classification Search
CPC .................................... G06F 12/0802
USPC ......................................... 711/118
See application file for complete search history.

(56) References Cited

U.S. PATENT DOCUMENTS

| 9,354,977 | B1* | 5/2016 | Backensto .......... G06F 11/1446 |
| 9,727,368 | B1  | 8/2017 | Tsirkin et al. |
| 2009/0150463 | A1 | 6/2009 | Sekiguchi et al. |
| 2009/0313445 | A1 | 12/2009 | Pandey et al. |

(Continued)

OTHER PUBLICATIONS

International Search Report for the International Patent Application No. PCT/CN2018/108206, dated Jul. 8, 2019, 8 pages.

*Primary Examiner* — Jae U Yu
(74) *Attorney, Agent, or Firm* — Kacvinsky Daisak Bluni PLLC

(57) ABSTRACT

Various embodiments are generally directed to virtualized systems. A first guest memory page may be identified based at least in part on a number of accesses to a page table entry for the first guest memory page in a page table by an application executing in a virtual machine (VM) on the processor, the first guest memory page corresponding to a first byte-addressable memory. The execution of the VM and the application on the processor may be paused. The first guest memory page may be migrated to a target memory page in a second byte-addressable memory, the target memory page comprising one of a target host memory page and a target guest memory page, the second byte-addressable memory having an access speed faster than an access speed of the first byte-addressable memory.

25 Claims, 12 Drawing Sheets

(56) References Cited

U.S. PATENT DOCUMENTS

2011/0119427 A1    5/2011   Dow et al.
2011/0167194 A1*  7/2011   Scales ................. G06F 11/2097
                                                         711/6

* cited by examiner

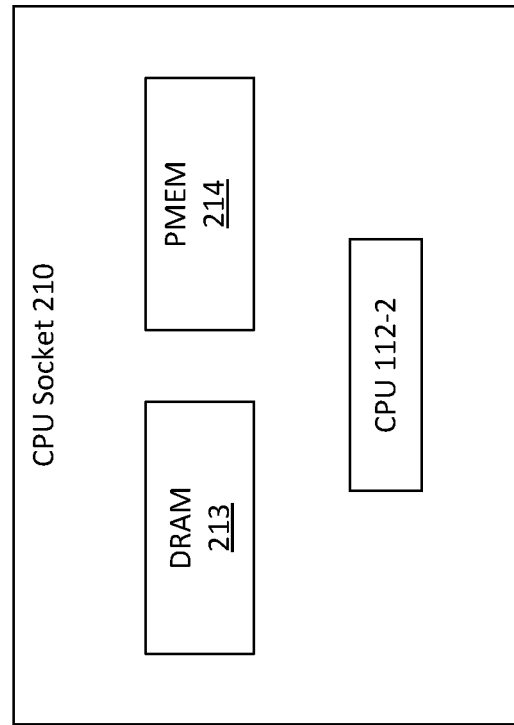
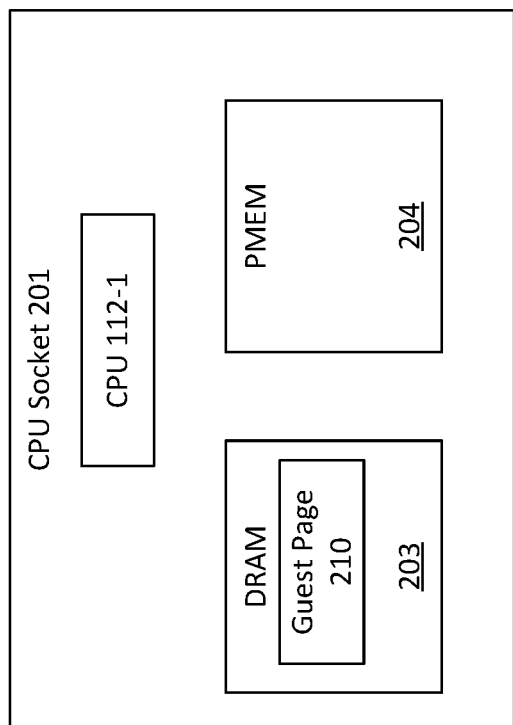
FIG. 2B

METHOD AND APPARATUS TO USE DRAM AS A CACHE FOR SLOW BYTE-ADDRESSIBLE MEMORY FOR EFFICIENT CLOUD APPLICATIONS

CROSS-REFERENCE TO RELATED APPLICATION

This application is a national phase claiming the benefit of and priority to International Patent Application No. PCT/CN2018/108206, entitled "A METHOD AND APPARATUS TO USE DRAM AS A CACHE FOR SLOW BYTE-ADDRESSIBLE MEMORY FOR EFFICIENT CLOUD APPLICATIONS" filed Sep. 28, 2018, which is hereby incorporated by reference in its entirety.

TECHNICAL FIELD

Embodiments described herein relate to the field of computing devices. More specifically, embodiments described herein relate to using DRAM as a cache of slow byte-addressable memory for efficient cloud applications.

BACKGROUND

Some computing systems use bulk byte-addressable persistent memory (PMEM). PMEM is high density and low cost, making it an ideal memory type for cloud computing platforms, as cloud platforms use large amounts of memory to host multiple applications and/or virtual machines (VMs). In cloud platforms, however, most applications and/or VMs are often idle (e.g., not being used). PMEM is slow relative to some other memory types, such as dynamic random-access memory (DRAM). PMEM has conventionally been exposed to system components as a storage device, rather than memory. As such, conventional systems have not been able to use PMEM directly. Previous attempts to allow the operating system to directly use PMEM require changes to the applications, are generally inefficient, and may be inaccurate in systems which have both DRAM and PMEM installed. Some solutions may directly expose PMEM to the system as slow byte addressable memory. As such, these solutions for operating system (OS) non-uniform memory access (NUMA) mechanisms are insufficient, as NUMA is implemented to address the challenge of speed difference between local memory and remote memory only, which may have latency differences to an order of magnitude of approximately 1-1.5×. However, PMEM may be much slower than DRAM, to an order of magnitude of approximately 10×-50×.

BRIEF DESCRIPTION OF THE DRAWINGS

FIGS. 2A-2B illustrate examples of migrating a memory page.

DETAILED DESCRIPTION

Figure 1:
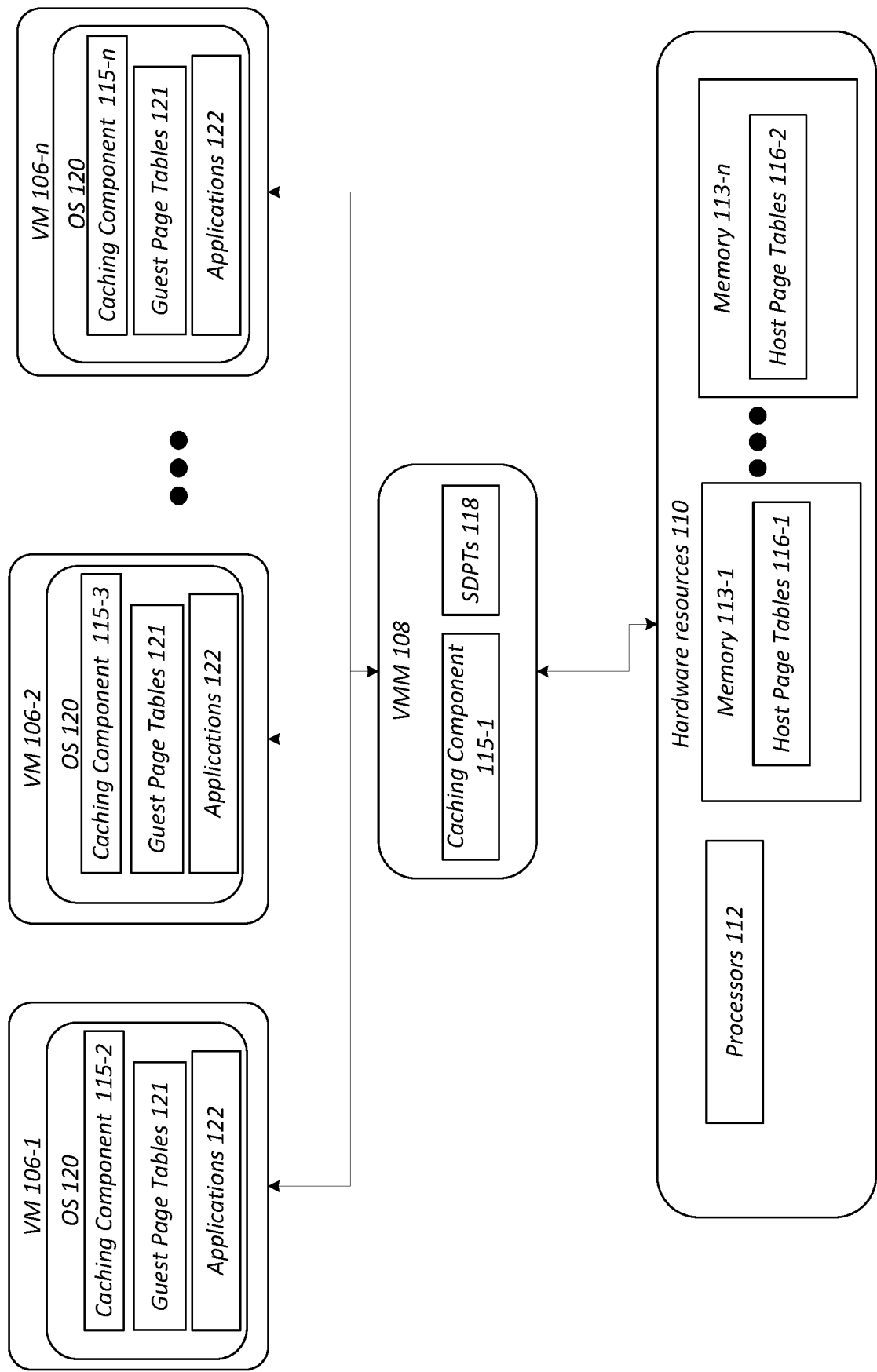
FIG. 1 illustrates an embodiment of a system.

Embodiments disclosed herein provide a framework to allow guest operating systems and associated applications to directly use bulk byte-addressable memory (such as PMEM) in virtualization environments. Generally, embodiments disclosed herein present the PMEM as a slower DRAM to guest components using basic input/output system (BIOS) and/or operating system reporting mechanisms (such as Advanced Configuration and Power Interface (ACPI)) and implement a caching mechanism to transfer frequently used (or "hot") guest memory pages from PMEM to DRAM, to reduce the memory load/flush cost.

More specifically, embodiments disclosed herein provide a two-level virtual non-uniform memory access (NUMA) mechanism, where a first level relates to the distance of a memory unit and/or corresponding memory pages to a processor (CPU). For example, the first level may differentiate between a local CPU memory and remote memory units (e.g., DRAM connected to remote CPU sockets), where the local CPU can access the local CPU memory faster than the remote memory units. The second level may relate to the differences in speed of different memory units (e.g., the speed of PMEM being slower than the speed of DRAM) and/or corresponding memory pages. Generally, embodiments disclosed herein partition these two-level memory pages into two memory regions, referred to herein as "fast memory pages," and "slow memory pages," as the major contributor to system latency is the speed difference between PMEM and DRAM units (e.g., in some examples, the access speed of DRAM is 10 times faster than the access speed of PMEM).

Furthermore, embodiments disclosed herein provide a caching mechanism to identify frequently used guest memory pages via a second-dimensional page table, such as an extended page table (EPT), nested page table (NPT), Second Level Address Translation (SLAT) and/or a guest page table based on the access bit in the corresponding page tables. Once identified, the caching mechanism may migrate frequently used guest memory pages to use the fast memory pages in DRAM to maximize performance of applications and/or VMs. Doing so may require the original memory page being replaced in the DRAM to be migrated to the slower memory pages in PMEM. Further still, embodiments disclosed herein may partition the guest memory into multiple regions and implement the caching mechanism in each region to save the cost of identifying frequently accessed guest memory pages in super guest memory space.

Advantageously, embodiments disclosed herein provide application-transparent solutions that can allow direct utilization of PMEM by applications executing in computing platforms and for a variety of different workloads. Further still, embodiments disclosed herein improve the performance of the two-level NUMA, which in turn improves the performance of systems which include PMEM.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an embodiment of a computing system 100. The system 100 is representative of any number and type of computing systems, such as a server, server farm, blade server, compute node, workstation, desktop computer, tablet computer, netbook computer, notebook computer, laptop computer, and the like. Embodiments are not limited in this manner. As shown, the computing system 100 includes hardware resources 110, a virtual machine monitor (VMM) 108, and one or more virtual machines (VMs) 106-1, 106-2, and 106-n, where "n" is any positive integer. The VMM 108 (also referred to as a hypervisor) is an application and/or logic that controls the creation and operation of the VMs 106-1, 106-2, 106-n(collectively referred to as VMs 106), and acts as a control and translation system between the VMs 106 and the hardware resources 110. Doing so allows an operating system (OS) 120 and applications 122 of the VMs 106 to access the hardware resources 110 in a virtualized environment (e.g., a cloud computing platform).

As shown, the hardware resources 110 include at least one or more processors (CPUs) 112, a first memory 113-1, and a second memory 113-n, where "n" is any positive integer. The hardware resources 110 include other elements that are not depicted for the sake of clarity (e.g., a bus, persistent storage, network interfaces, etc.). The processor 112 is representative of any number and type of computation element, such as a microprocessor, a processor, central processing unit, digital signal processing unit, dual-core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit.

The memory 113-1, 113-n is representative of any number and type of memory elements, and the number of memory elements depicted in FIG. 1 should not be considered limiting of the disclosure. However, the system 100 includes at least the memory 113-1 and the memory 113-n, which may be different types of memory. For example, the first memory 113-1 may be a DRAM DIMM, while the second memory 113-n may be a byte-addressable PMEM. The memory 113-1, 113-n may be any bulk byte-addressable memory, and the use of DRAM or PMEM herein should not be considered limiting of the disclosure. Generally, however, the DRAM 113-1 is faster than the PMEM 113-n. In one embodiment, the memory 113-n is implemented in a non-volatile DIMM (NVDIMM). As such, while the DRAM 113-1 and PMEM 113-n may physically connect to the same type of DIMM slot of the system 100, the physical architecture of the DRAM 113-1 and PMEM 113-n give each memory type different speed characteristics. For example, the DRAM 113-1 is faster than the PMEM 113-n. In some embodiments, the DRAM 113-1 is ten times faster than the PMEM 113-n. As such, the processors 112 may access data in the DRAM 113-1 more quickly than data in the PMEM 113-n. Furthermore, the distance of the DRAM 113-1 and/or PMEM 113-n to the processors 112 may further contribute to the data access times. Furthermore, a financial cost the DRAM 113-1 is greater than a financial cost of the PMEM 113-1 in terms of cost per storage unit. As such, the system 100 may include more (e.g., in gigabytes, terabytes, etc.) PMEM 113-n than DRAM 113-1. As shown, the DRAM 113-1 and PMEM 113-n include host page tables 116-1, and 116-2, respectively, which may be accessed by the VMM 108.

Advantageously, however, embodiments disclosed herein configure the memory 113-1, 113-n as two-level virtual NUMA to the VMs 106 (and/or the OSes 120 of each VM 106). More specifically, the system 100 presents the PMEM 113-n as a slower memory through BIOS/OS reporting mechanisms (such as virtual ACPI), and leverage the DRAM 113-1 as a faster cache for the PMEM 113-n. The applications 122 of the VMs 106 may then identify the DRAM 113-1 as a relatively faster memory, and the PMEM 113-n as a relatively slower memory. The caching component 115 (which includes instances 115-1, 115-2, 115-3, 115-n, where "n" is any positive integer) of the VMM 108 and the VMs 106 may generally identify "hot" (or frequently used) guest pages of memory 113-n and migrate the identified hot guest pages to the DRAM 113-1. A guest memory page is a memory page used by the VMs 106 and/or the corresponding OS 120 and/or applications 122 executing therein.

To identify hot guest pages, the caching component 115 of the VMM 108 may monitor the access bit of entries in the second-dimensional page tables (SDPT) 118 and/or the guest page tables 121 of the VMs 106. Although depicted as part of the OS 120, the guest page tables 121 may be a component of the corresponding VM 106. Generally, the guest page tables 121 include a plurality of entries, each entry mapping one or more guest virtual memory addresses to guest physical memory addresses for memory address translation. Furthermore, the guest page tables 121 may include multiple layers (e.g., 4 layers of page tables in 64 bits). Some entries (e.g., leaf entries) in the guest page tables 121 may include an access bit indicating whether the memory translation has been accessed. The SDPTs 118 include a plurality of entries, some entries (e.g., leaf entries) mapping one or more guest physical memory addresses to one or more host physical addresses. Each entry in the SDPTs 118 similarly includes an access bit indicating whether the corresponding memory translation has been accessed. The VMM 108 provides a distinct SDPT 118 for each VM 106-1 through 106-n. The SDPTs 118 are representative of any type second-dimensional page table, such as a nested page table (NPT), Second Level Address Translation (SLAT) table, and the like.

Generally, an application 122 may use virtual addresses {VA1, VA2, . . . , VAn}, where "n" is a positive integer. Some of these virtual addresses may map to the same memory pages, where the application 122 uses memory pages {PA1, PA2, . . . , PAm}, where "m" is any positive integer. When the application 122 accesses a memory page X, it may lead to a cache load and/or a cache flush. For a given memory page X, the application 122 triggers a cache load at a frequency of $f_x^R$ for load-reads and triggers a cache flush at a frequency of $f_x^W$ for flush-writes. The system 100 may use $N_T$ pages of memory, namely $N_d$ or $\{D_0, D_1, \ldots, D_{Nd-1}\}$ pages of DRAM 113-1, and $N_p$ or $\{P_0, P_1, \ldots, P_{Np-1}\}$ pages of PMEM 113-n, where $N_T = N_d + N_p$.

Furthermore, the system 100 may expose two or more topologies for the DRAM 113-1 and PMEM 113-n to the VMs 106 (and/or components thereof), namely an exclusive topology and an inclusive topology. In the exclusive topology, the guest total memory pages are equal to $N_T = N_d + N_p$, which means the DRAM 113-1 is directly used as guest memory pages with dedicated guest physical addresses. In the inclusive topology, the total guest memory pages are equal $N_T = Np$, which means the DRAM 113-1 is not exposed as guest memory pages, but it is used as cache of certain PMEM pages only (in this case, the cache DRAM has a host side physical page address, but it doesn't have a guest side physical page address). Furthermore, a hybrid mode combining the exclusive and inclusive modes is possible, where the system may include exclusive DRAM $N_{d_x}$ and inclusive DRAM $N_{d_i}$.

The performance overhead $T_A$ in the system arises from memory loads and/or writes due to CPU cache loads and/or flushes. Stated differently, the total overhead $T_A = K_1 \cdot (\sum_{i=0}^{Np-1} L_1 * F^A Pi + \sum_{i=0}^{Nd-1} 1 * F^A Di)$, where DRAM read latency is normalized to 1, and $L_1$ corresponds to PMEM read/write latency ratio (which may be on the order of 10×-30×). To achieve the best system performance, the caching component 115 reduces the cost of $T_A$ by identifying hot memory pages in the PMEM 113-n, and uses the DRAM 113-1 to back the identified hot memory pages.

In some embodiments, the caching component 115 may partition the memory 113-n into different regions (e.g., 10 regions, 100 regions, etc.) to identify hot memory pages therein. For example, each region of n different regions may include 1/n of the size of the PMEM 113-n, and 1/n size of the DRAM 113-1. Doing so saves time in identifying hot memory pages, as walking the entire SDPT 118 and/or guest page tables 121 may require significant time and computing resources. In other embodiments, the caching component 115 does not partition the PMEM memory 113-n, and identifies hot memory pages across the entire PMEM memory 113-n.

Generally, to identify hot memory pages, the caching component 115 clears the access bit A for each entry in the SDPT 118 of a VM 106 (or for a subset of entries in the SDPT 118 corresponding to a partitioned memory region). The caching component 115 may then wait a predefined amount of time (e.g., 1 microsecond, 10 microseconds, etc.), and re-walk the SDPT 118 to identify entries having access bits A with "set" values (e.g., a value indicating the translation, and therefore the corresponding memory page, have been accessed). If the access bit of a given entry is set, the caching component 115 increments an access counter value for the entry and/or the corresponding memory page (e.g., $F_x^A = F_x^A + 1$). The caching component 115 may repeat this process a predefined number of times (e.g., 1,000 times, 10,000 times, etc.). Once repeated, the greatest access counter values $F_x^A$ reflect the memory pages that have been accessed the most frequently, and are therefore the "hot" pages of the guest memory pages. The hot pages may be in the PMEM 113-n, which is not optimal, and these hot pages can be referred to as candidates for migration to the DRAM 113-1. In some embodiments, an absolute threshold value (e.g., 10, 100, 200, etc.) may define which pages are "hot", e.g., those pages having access counter values $F^A$ that exceed the threshold value. In some embodiments, a relative threshold value (e.g., top 100, top 200, or top 10%/top 20% etc.) may define which pages are "hot", e.g., those pages having the largest access counter values $F_x^A$. In some embodiments, the caching component 115 only considers hot memory pages in the PMEM 113-n, not the DRAM 113-1, as candidates for migration, as hot memory pages in the DRAM 113-1 do not need to be moved to optimize system performance.

Similarly, the caching component 115 of an OS 120 (and/or a VM 106) may identify hot guest memory pages by clearing and monitoring the access bit of the guest page tables 121. Generally, the OS 120 uses a guest virtual address as an index of the guest page table 121 (which may include multiple guest page tables 121 of the corresponding OS 120 at a certain period of time). However, the caching component 115 considers the physical address from the virtual address of the entry in the guest page table 121 to determine which guest physical memory pages are being most frequently accessed. Generally, if a memory page is accessed by two or more applications using two or more guest page tables, the set of access bits for the entry of either page table 121 is ORed to indicate the access of the corresponding guest memory page. When using the guest page table 121, the caching component 115 of the OS 120 determines the corresponding guest physical address X, and increments $F_x^A = F_x^A + 1$ if the access bit in either one of the guest page table entry (pointing to guest physical address X) get set. Doing so allows the caching component 115 to monitor the guest memory pages over time (e.g., over 1,000 iterations), and use the determined $F_x^A$ values to identify the hottest guest memory pages in the PMEM 113-1. The caching component 115 may then trigger migration of the hottest guest memory pages in the PMEM 113-1 to DRAM 113-1.

The caching component 115 may also implement a migration policy to select a predefined number of hot pages in the PMEM 113-n for migration to the DRAM memory 113-1. In one embodiment, the caching component 115 may sort the access counter values $F_x^A$ from greatest to least to identify the most frequently accessed memory pages in the PMEM 113-n.

According to one migration policy, the caching component 115 chooses the N pages having the greatest access counter values $F_x^A$, where N is equal to the number of DRAM pages $N_d$ and get page set $T_d = \{T_0, T_1, \ldots, T_{Nd-1}\}$. The caching component 115 migrates the M pages (where M≤N) with any pages in the PMEM 113-n and that are in page set $T_d$. Stated differently, if a DRAM page is within $T_d$, it is not migrated. If a page is not within $T_d$, the page is migrated to the PMEM 113-*n*, and a hot memory page from PMEM 113-*n* is migrated to the DRAM 113-1. Generally, the pages in PMEM 113-*n* having the greatest access counter values $F_x^A$ are migrated before pages in PMEM 113-*n* having lower access counter values $F_x^A$. In some embodiments, the system 100 may share memory pages among the VMs 106. As such, the caching component may migrate a page in the set of pages $T_d$ with a host-side memory page in the PMEM 113-*n*.

According to a second migration policy, the caching component 115 may choose more hot pages for migration in the candidate set of pages $T_d$ based on the access counter values $F_x^A$. For example, the second policy may specify to select 1.5 times more pages than the first migration policy. As such, the caching component 115 chooses the $1.5 \times N_d$ pages in page set $T_d$ having the greatest access counter values $F_x^A$. In one embodiment, if a guest memory page $R_d$ mapped by DRAM page is within $T_d$, it may be not migrated. Otherwise, the DRAM page $R_d$ may be migrated with a page $R_p$ mapped by PMEM and is not in page set $T_d$. The second migration policy may save migration effort by not migrating all top hot pages if the previous page mapped by DRAM is less hot (but not hotter than the guest memory page). In some embodiments, "cold" memory pages having low access counter values $F_x^A$ may be migrated from DRAM 113-1 to the PMEM 113-*n*.

In some embodiments, the system 100 may share memory pages among the VMs 106. As such, the caching component may migrate a page $T_x$ with a host-side memory page in the PMEM 113-*n*. In some embodiments, the system 100 may share memory pages among the VMs 106. As such, the caching component may migrate a page $T_x$ with a host-side memory page in the PMEM 113-*n*.

In some embodiments, the caching component 115-1 of the VMM 108 may consider multiple VMs 106 as a bundle to transfer hot memory pages from the PMEM 113-*n* to the DRAM 113-1. In such an embodiment, the caching component 115-1 considers the hottest memory pages having the greatest access counter values $F_x^A$ across the entire memory space of the system.

To migrate pages, in one embodiment, the caching component 115-1 of the VMM 108 may migrate a hot guest memory page GPN-X in PMEM 113-*n* with a target guest memory page GPN-Y in the DRAM 113-1. In such an example, the SDPT 118 maps hot guest memory page GPN-X to host memory page HPN-X, and maps target guest memory page GPN-Y with host memory page HPN-Y. In such an example, the caching component 115-1 of the VMM 108 temporarily pauses the execution of the corresponding VM 106 (and any associated OS 120 and/or applications 122), and identifies a temporary page Z in the DRAM 113-1. The caching component 115-1 of the VMM 108 may then copy the contents of HPN-X to DRAM page Z. The caching component 115-1 of the VMM 108 may then copy the contents of HPN-Y to HPN-X, and then copy the contents of DRAM page Z to HPN-Y. The caching component 115-1 of the VMM 108 may then modify the SDPT 118 for the VM 106 to map GPN-X to HPN-X, and GPN-Y to HPN-X. The caching component 115-1 of the VMM 108 may then flush the translation cache of the SDPT 118 (including at least existing entries for GPN-X and GPN-Y), and resume the execution of the VM 106.

In another embodiment, the caching component 115-1 of the VMM 108 may migrate a hot guest memory page GPN-X in PMEM (whose host page number is HPN-X) 113-*n* with a target DRAM page DDD (where DDD corresponds to a host page number, and does not have a guest physical page number), which is currently caching a guest PMEM page GPN-Y (whose host page number is HPN-Y) in the inclusive topology. In such an example, the caching component 115-1 of the VMM 108 temporarily pauses the execution of the corresponding VM 106 (and any associated OS 120 and/or applications 122), and flushes the contents of DRAM page DDD to guest PMEM GPN-Y by copying the contents of page DDD to page HPN-Y. Then, the caching component 115-1 loads the contents of GPN-x in PMEM to DRAM DDD. This can be achieved by copying the contents of page HPN-X to page DDD. The caching component 115-1 of the VMM 108 may then modify the SDPT 118 for the VM 106 to map GPN-X to DDD, and GPN-Y to HPN-Y. The caching component 115 of the VMM 108 may then flush the translation cache of the SDPT 118 (including at least existing entries for GPN-X and GPN-Y), and resume the execution of the VM 106. This is helpful in some cases since it saves the data copy effort happened during the page migration time compared to the exclusive topology. In such an embodiment, the fixed size of the DRAM 113-*n* is used for caching.

In another embodiment, an additional DRAM page is used for caching. More specifically, the caching component 115-1 of the VMM 108 may migrate a hot guest memory page GPN-X (whose host page number is HPN-X) in PMEM 113-*n* with a target free host memory page DDD in the DRAM 113-1. In such an embodiment, the SDPT 118 for the corresponding VM 106 includes a translation entry which maps GPN-X to HPN-X, and does not include an entry for host memory page DDD. In such an example, the caching component 115-1 of the VMM 108 temporarily pauses the execution of the corresponding VM 106 (and any associated OS 120 and/or applications 122). The caching component 115-1 of the VMM 108 may then copy the contents of HPN-X to target host memory page DDD. The caching component 115-1 of the VMM 108 may then modify the SDPT 118 for the VM 106 to map GPN-X to target host memory page DDD in the DRAM 113-1. The caching component 115-1 of the VMM 108 may then flush the translation cache for the SDPT 118 (including any existing entries for GPN-X), and free HPN-X. The caching component 115-1 of the VMM 108 may then resume execution of the paused VM 106.

In another embodiment, the caching component 115 of the VMs 106 (and/or the corresponding OS 120) may migrate pages in the PMEM 113-*n* in the guest side. For example, the caching component 115-2 of VM 106-1 may migrate hot guest memory page GPN-X in PMEM 113-*n* with target guest memory page GPN-Y in DRAM 113-1. In such an embodiment, the guest page table 121 of the OS 120 of VM 106-1 may map virtual address VA-X1 (and optionally virtual addresses {VA-X2, VA-X3, . . . , VA-Xn}) to GPN-X and virtual address VA-Y1 (and optionally virtual addresses {VA-Y2, VA-Y3, . . . , VA-Yn}) to GPN-Y. The caching component 115-2 of VM 106-1 may temporarily pause the execution of any applications 120 using VA-X1 and VA-Y1. The caching component 115-2 of VM 106-1 may allocate a page Z (this is a guest physical page number i.e. GPN) in the DRAM 113-1, and copy the contents of GPN-X to Z. The caching component 115-2 of VM 106-1 may then copy the contents of page GPN-Y to page GPN-X. The caching component 115-2 of VM 106-1 may then copy the contents of DRAM page Z to page GPN-Y. The caching component 115-2 of VM 106-1 may then modify the guest page table 121 to map {VA-X2, VA-X3, . . . , VA-Xn} to GPN-Y, and map {VA-Y2, VA-Y3, . . . , VA-Yn} to GPN-X. The caching component 115-2 of VM 106-1 may then flush a translation lookaside buffer (TLB) of at least any existing entries for VA-X1 and Va-Y1 and resume execution of the paused applications In another example applicable to the exclusive topology, the caching component 115 of the VMs 106 (and/or the corresponding OS 120) may migrate a hot guest page GPN-X in PMEM 113-n with a free target guest page GPN-Y in DRAM 113-1. For example, the guest page table 121 of the OS 120 of VM 106-1 may map virtual address VA-X1 (and optionally virtual addresses {VA-X2, VA-X3, . . . , VA-Xn}) to GPN-X. The caching component 115-2 of VM 106-1 may then temporarily pause execution of the applications 122 using VA-X1, and allocate GPN-Y in the DRAM 113-1. The caching component 115-2 of VM 106-1 may then copy the contents of GPN-X to GPN-Y. The caching component 115-2 of VM 106-1 may then modify the guest page table 121 to map {VA-X2, VA-X3, . . . , VA-Xn} to GPN-Y, and free page GPN-X, and flush the TLB of any entries for VA-X1, and resume execution of the paused applications 122.

Although the caching component 115-2, 115-3, 115-n is depicted in the OS 120 of the VMs 106, the caching component 115 may be a component of the corresponding VM 106. Regardless of the particular configuration, the caching component 115 in the VM 106 may migrate memory pages based on page tables managed by the VM 106 as described above.

Figure 2A:
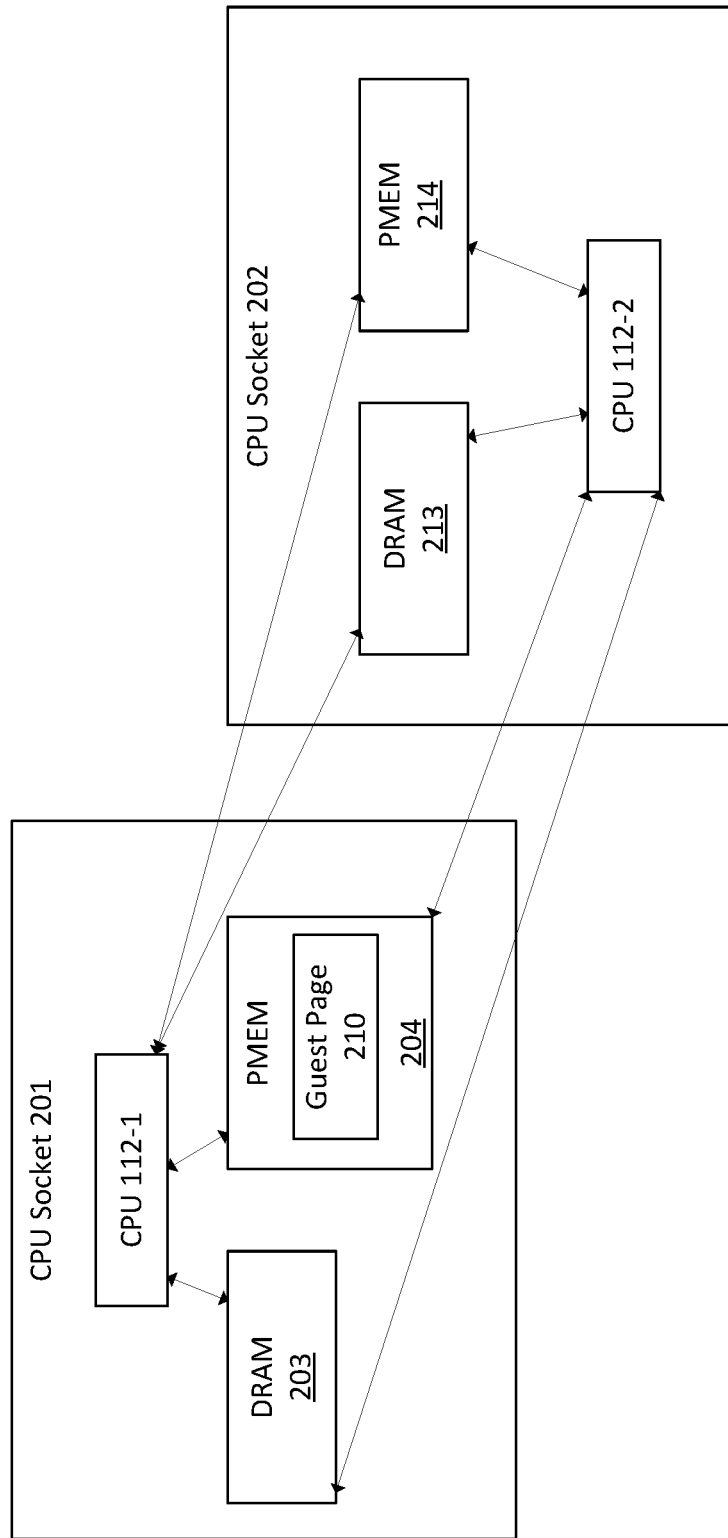

FIG. 2A is a schematic 200 illustrating components of the system 100 in greater detail. As shown, the schematic 200 depicts two example CPU sockets 201, 202. As shown, the CPU socket 201 includes an example processor, namely CPU 112-1, a DRAM 203, and a PMEM 204. Similarly, the CPU socket 202 includes a CPU 112-2, a DRAM 213, and a PMEM 214. Generally, the DRAM 203, 213 may correspond to the DRAM 113-1 of FIG. 1, while the PMEM 204, 214 may correspond to the PMEM 113-n of FIG. 1. However, as shown, the DRAM 203, 213 and PMEM 204, 214 are distinct memory elements.

As stated, the DRAM 203, 213 may have faster access speeds than the PMEM 204, 214. Furthermore, the location of the DRAM 203, 213 and/or the PMEM 204, 214 may introduce additional latency for access times by the CPUs 112-1, 112-2. Generally, the CPUs 112-1, 112-2 can access data in the DRAM 203, 213 and the PMEM 204, 214 more quickly when the memory is in the same socket as the CPU. Therefore, the CPU 112-1 may incur additional latency when accessing DRAM 213 and/or PMEM 214 relative to DRAM 203 and/or PMEM 204. Similarly, CPU 112-2 may incur additional latency when accessing DRAM 203 and/or PMEM 204 relative to accessing DRAM 213 and/or PMEM 214.

As shown, PMEM 204 includes an example guest memory page 210. As stated, the caching component 115 may determine that guest memory page 210 is a "hot" memory page by monitoring the access bit for an entry in the SDPT 118 and/or guest page table 121 including a translation for guest memory page 210. As stated, the caching component 115 may clear the access bit for the entry in the SDPT 118 and/or guest page table 121, wait a predefined period of time, and check to see if the access bit for the entry has been set. If the access bit has been set, the caching component 115 increments the access counter value for the guest page table 210. After a predefined number of repetitions, the caching component 115 may determine, based on the access counter value, that the guest page table 210 is a hot, or frequently accessed guest memory page. For example, the caching component 115 may determine that the access counter value exceeds a hot threshold, or the access counter value is the greatest access counter value across all memory pages, and/or that the access counter value is one of the N greatest access counter values. As such, the caching component 115 may determine to migrate guest memory page 210 to DRAM 203 and/or DRAM 213.

FIG. 2B depicts the migration of guest memory page 210 from PMEM 204 to DRAM 203. The caching component 115 may perform the migration as described above. FIGS. 2A-2B are for illustration purposes only, and should not be considered limiting of the disclosure. As stated above, the caching component 115, in migrating the guest memory page 210, may need to evict a page in DRAM 203, and may further update translations in the SDPT 118 and/or guest page table 121 to reflect the new location of guest memory page 210.

Figure 3:
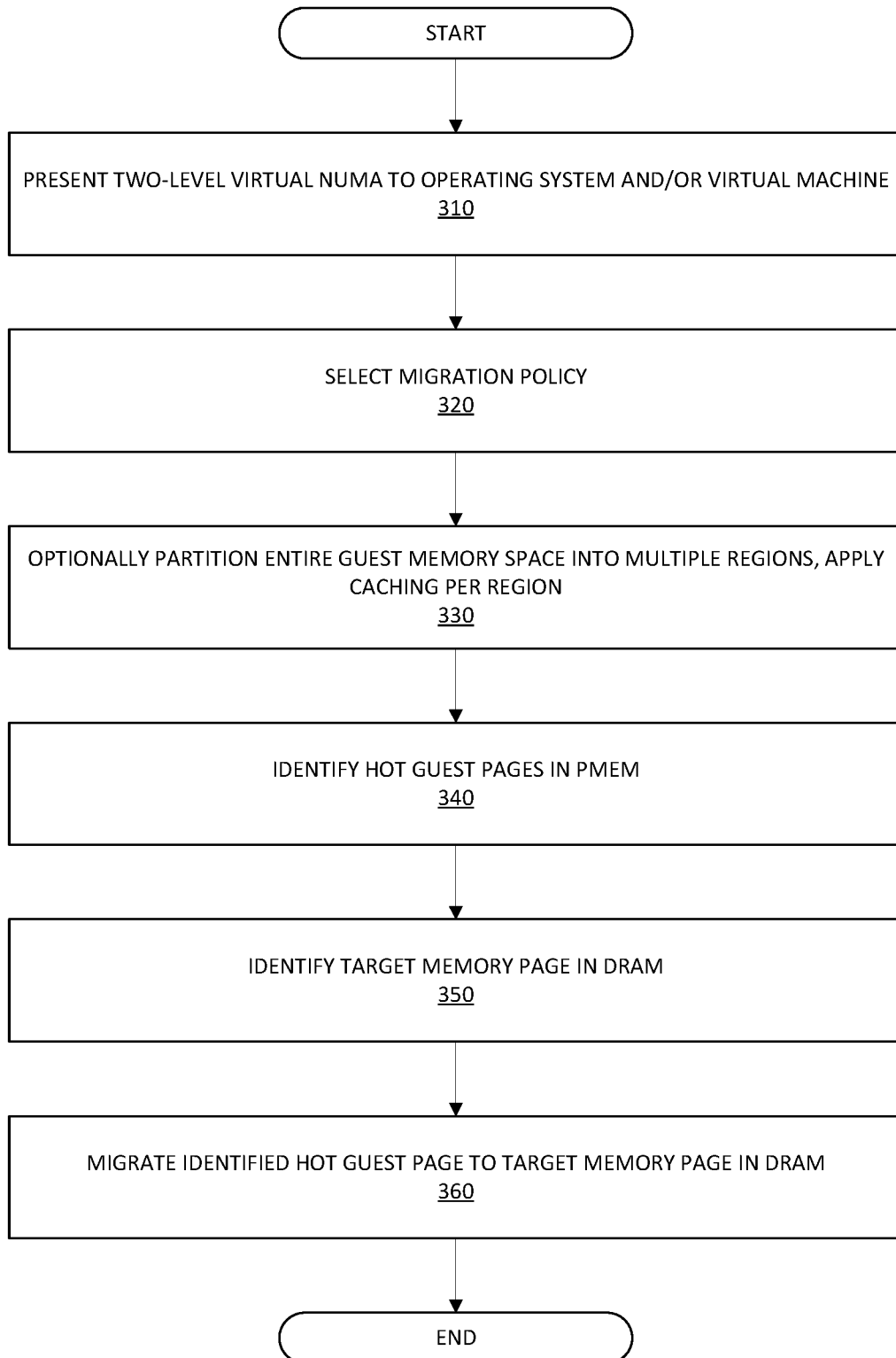
FIG. 3 illustrates an embodiment of a first logic flow.

FIG. 3 illustrates an embodiment of a logic flow 300. The logic flow 300 may be representative of some or all of the operations executed by one or more embodiments described herein. Embodiments are not limited in this context. For example, the caching component 115 of the system 100 may perform the operations in logic flow 300 to identify hot guest memory pages in PMEM and migrate the identified pages to faster DRAM.

As shown, the logic flow 300 begins at block 310, where the system 100 presents a two-level virtual NUMA to the OSes 120 and/or VMs 106. The two-level virtual NUMA includes providing, to the OSes 120 and/or VMs 106, direct access to the DRAM 113-1 and PMEM 113-n. As stated, the DRAM 113-1 and PMEM 113-n may have different physical characteristics that make DRAM 113-1 faster than PMEM 113-n in operation. Similarly, the further the DRAM 113-1 and/or the PMEM 113-n are from a given processor, additional access latency is introduced.

At block 320, the caching component 115 selects a migration policy for migrating memory pages. As stated above, a plurality of migration policies may be provided. The given migration policy may be selected based on monitored performance improvements realized based on the given policy. In another example, a system administrator may select the policy. At block 330, the caching component 115 may optionally partition the memory of the system 100 into multiple regions. Doing so allows the caching component 115 to perform DRAM-backing of the PMEM at the partition level, rather than across the entire memory space of the system 100, which may provide improved system performance. At block 340, the caching component 115 identifies one or more hot (or frequently accessed) guest memory pages in the PMEM 113-n. As stated, in some embodiments, the hot guest pages may be identified in a region of the PMEM 113-n. As stated, the caching component 115 monitors the access bit for translation entries in the SDPT 118 and/or guest page tables 121 corresponding to a given memory page. Over time, the caching component 115 determines access counter values for each guest memory page. The caching component 115 may select one or more hot guest pages based on the greatest determined access counter values.

At block 350, the caching component 115 identifies a target memory page in the DRAM 113-1. In at least one embodiment, the caching component 115 randomly selects an available memory page in the DRAM 113-1 as the target memory page. If no memory pages are freely available, the caching component 115 may determine to select the least most recently used memory page. At block 360, the caching component 115 migrates the hot guest memory page identified at block 340 to the target memory page identified at block 350. Doing so improves performance of the system 100 by moving more frequently accessed memory pages from the slower PMEM 113-*n* to the faster DRAM 113-1.

Figure 4:
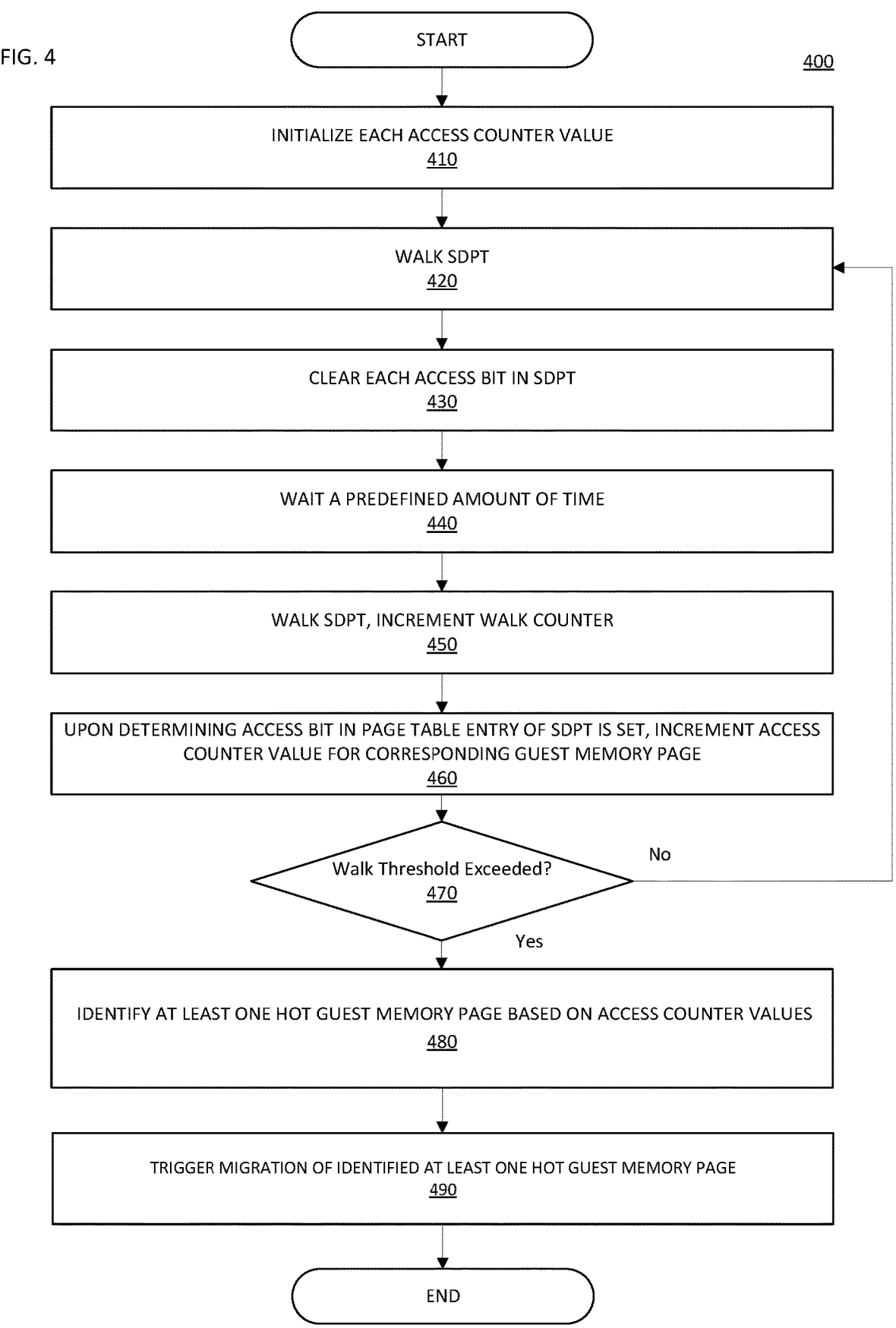
FIG. 4 illustrates an embodiment of a second logic flow.

FIG. 4 illustrates an embodiment of a logic flow 400. The logic flow 400 may be representative of some or all of the operations executed by one or more embodiments described herein. Embodiments are not limited in this context. For example, the caching component 115 may perform the logic flow 400 to identify hot memory pages in the PMEM 113-1 based on the SDPT 118. Although the SDPT 118 is used as an example, the caching component 115 of the OS 120 may identify hot pages in the PMEM 113-*n* using the guest page tables 121.

At block 410, the caching component 115 initializes (e.g., sets to zero) an access counter value for each guest memory page in the PMEM 113-*n* having an entry in the SDPT 118. The caching component 115 may also initialize a walk counter which counts the number of walks of the SDPT 118 performed by the caching component 115. At block 420, the caching component 115 walks the SDPT 118. As stated, in some embodiments, the caching component 115 walks a portion of the SDPT 118 corresponding to a region of the PMEM 113-*n*. At block 430, the caching component 115 clears (e.g., sets to zero) each access bit in the SDPT 118. At block 440, the caching component 115 waits a predefined amount of time. At block 450, the caching component 115 again walks the SDPT 118, and increments the walk counter. Generally, in walking the SDPT 118, the caching component 115 determines whether the access bit for each entry in the SDPT 118 has been set to 1. At block 460, the caching component 115 increments the access counter value for a guest memory page in the PMEM 113-*n* upon determining the access bit in the SDPT 118 for the guest memory page is set. At block 470, the caching component 115 determines whether the walk counter value exceeds a walk threshold (e.g., 1,000). If the walk counter does not exceed the threshold, the caching component 115 returns to block 420 (e.g., to clear and monitor the access bits in the SDPT 118). Otherwise, the caching component 115 proceeds to block 480, where the caching component 115 identifies at least one hot guest memory page based on the access counter values. As stated, the greater the access counter value, the more frequently the associated memory page in the PMEM 113-*n* is accessed. Therefore, the caching component 115 identifies the most frequently used, or "hot", guest memory pages in the PMEM 113-*n* based on the access counter values. Therefore, for example, if guest memory page X has an access counter value of 300, and guest memory page Y has an access counter value of 200, the caching component 115 may determine that guest memory page X is the hot memory page. However, in some embodiments, the caching component 115 may further determine that guest memory page Y is also a hot memory page. At block 490, the caching component 115 triggers the migration of the hot memory page identified at block 480 based on the access counter values.

Figure 5:
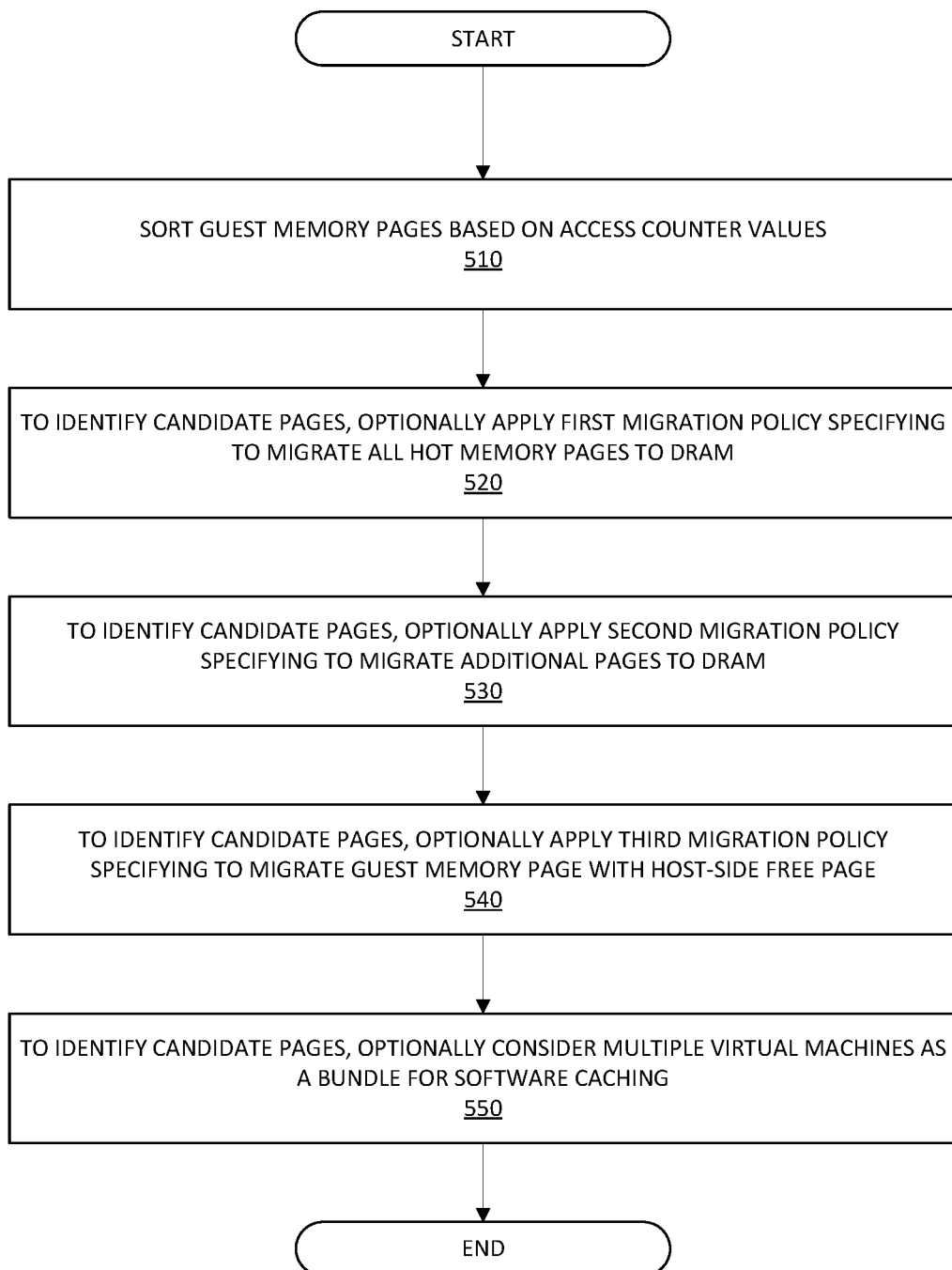
FIG. 5 illustrates an embodiment of a third logic flow.

FIG. 5 illustrates an embodiment of a logic flow 500. The logic flow 500 may be representative of some or all of the operations executed by one or more embodiments described herein. Embodiments are not limited in this context. For example, the caching component 115 may perform the logic flow 500 to identify frequently used memory pages for migration.

As shown, at block 510, the caching component 115 sorts the guest memory pages based on the determined access counter values for each guest memory page (e.g., determined according to the logic flow 400). At block 520, the caching component 115 optionally applies a first migration policy to identify a set of candidate memory pages in the PMEM 113-*n* by identifying each memory page having an access counter value that exceeds a hot access counter threshold. For example, if the hot access counter threshold is 250, the caching component 115 determines to migrate each guest memory page having an access counter value that exceeds 250. Doing so ensures that each hot memory page is migrated from the PMEM 113-*n* to the DRAM 113-1. As another example, the first migration policy may specify to migrate N memory pages in the PMEM 113-1 having the greatest access counter values.

At block 530, the caching component 115 identifies candidate pages by applying a second migration policy. The second migration policy may specify to migrate all hot memory pages and additional memory pages. In some embodiments, if the hot memory page is in DRAM 113-1, the page is not migrated. For example, if the hot access counter threshold is 250, a second access counter threshold may be 100. Therefore, the caching component 115 may migrate all (or a predefined number of) guest memory pages from the PMEM 113-*n* that have access counter values exceeding 100. As another example, the second migration policy may specify to migrate N+M (or N times 1.5, or some other multiplier) memory pages in the PMEM 113-1 having the greatest access counter values.

At block 540, the caching component 115 may optionally apply a third migration policy which specifies to migrate guest memory pages with free host memory pages. At block 550, the caching component 115 optionally considers multiple VMs 106 as a bundle. For example, at blocks 520 and/or 530, the caching component 115 may consider the highest access counter values across all VMs 106, rather than for a single VM 106.

Figure 6:
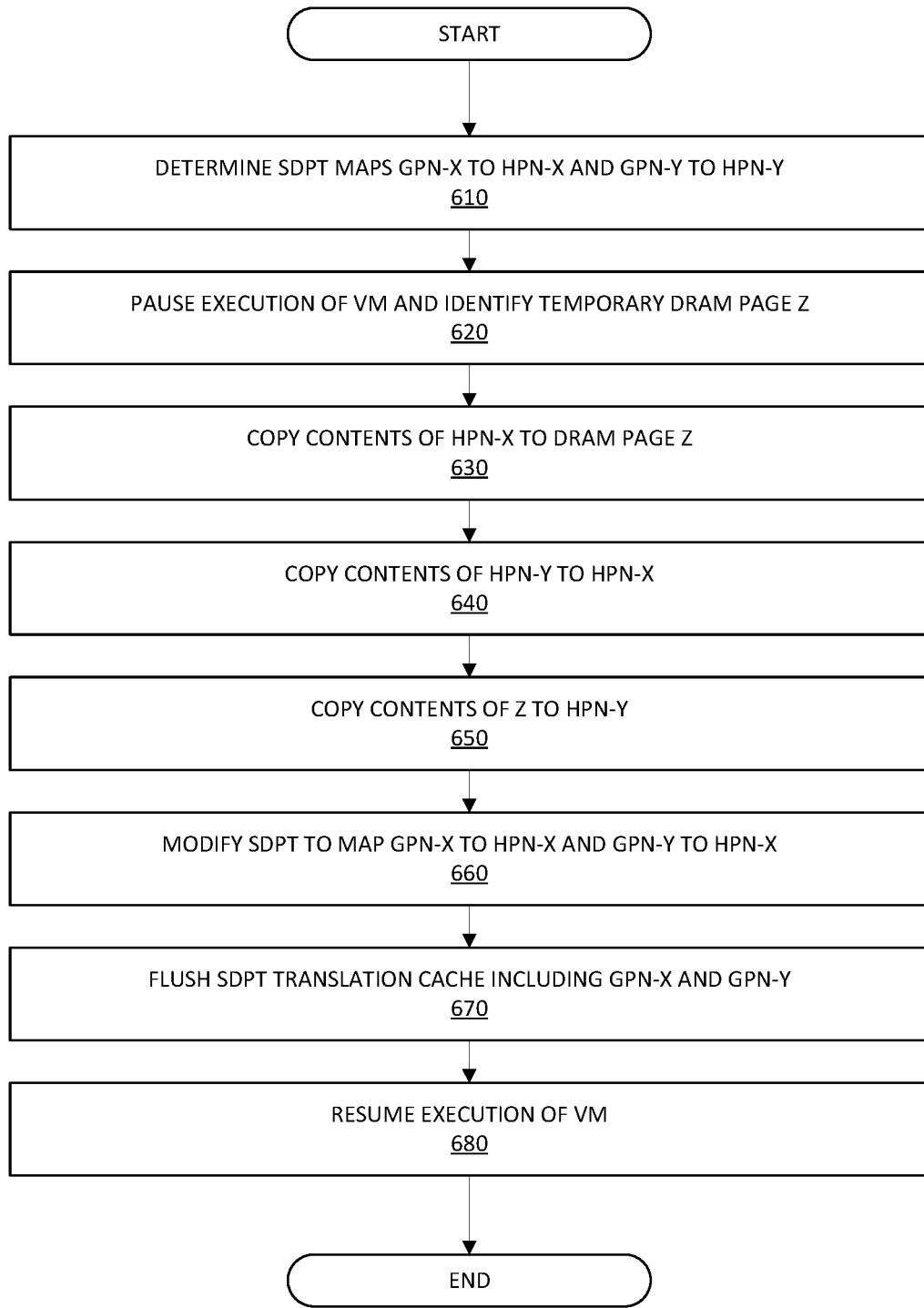
FIG. 6 illustrates an embodiment of a fourth logic flow.

FIG. 6 illustrates an embodiment of a logic flow 600. The logic flow 600 may be representative of some or all of the operations executed by one or more embodiments described herein. Embodiments are not limited in this context. For example, the caching component 115-1 of the VMM 108 may perform the logic flow 600 to migrate a hot guest memory page GPN-X in PMEM 113-*n* with a target guest memory page GPN-Y in the DRAM 113-1.

At block 610, the caching component 115 determines that the SDPT 118 for the VM 106 maps the hot guest memory page GPN-X to host memory page HPN-X, and maps target guest memory page GPN-Y with host memory page HPN-Y. At block 620, the caching component 115-1 of the VMM 108 temporarily pauses the execution of the corresponding VM 106 (and any associated OS 120 and/or applications 122), and identifies a temporary page Z in the DRAM 113-1. At block 630, the caching component 115-1 of the VMM 108 copies the contents of HPN-X to DRAM page Z. At block 640, the caching component 115-1 of the VMM 108 copies the contents of HPN-Y to HPN-X. At block 650, the caching component 115-1 of the VMM 108 copies the contents of DRAM page Z to HPN-Y. At block 660, the caching component 115-1 of the VMM 108 modifies the SDPT 118 for the VM 106 to map GPN-X to HPN-X, and GPN-Y to HPN-X. At block 670, the caching component 115-1 of the VMM 108 may then flush the translation cache of the SDPT 118 (including at least any existing entries for GPN-X and GPN-Y). At block 680, the caching component 115-1 of the VMM 108 resume the execution of the VM 106.

Figure 7:
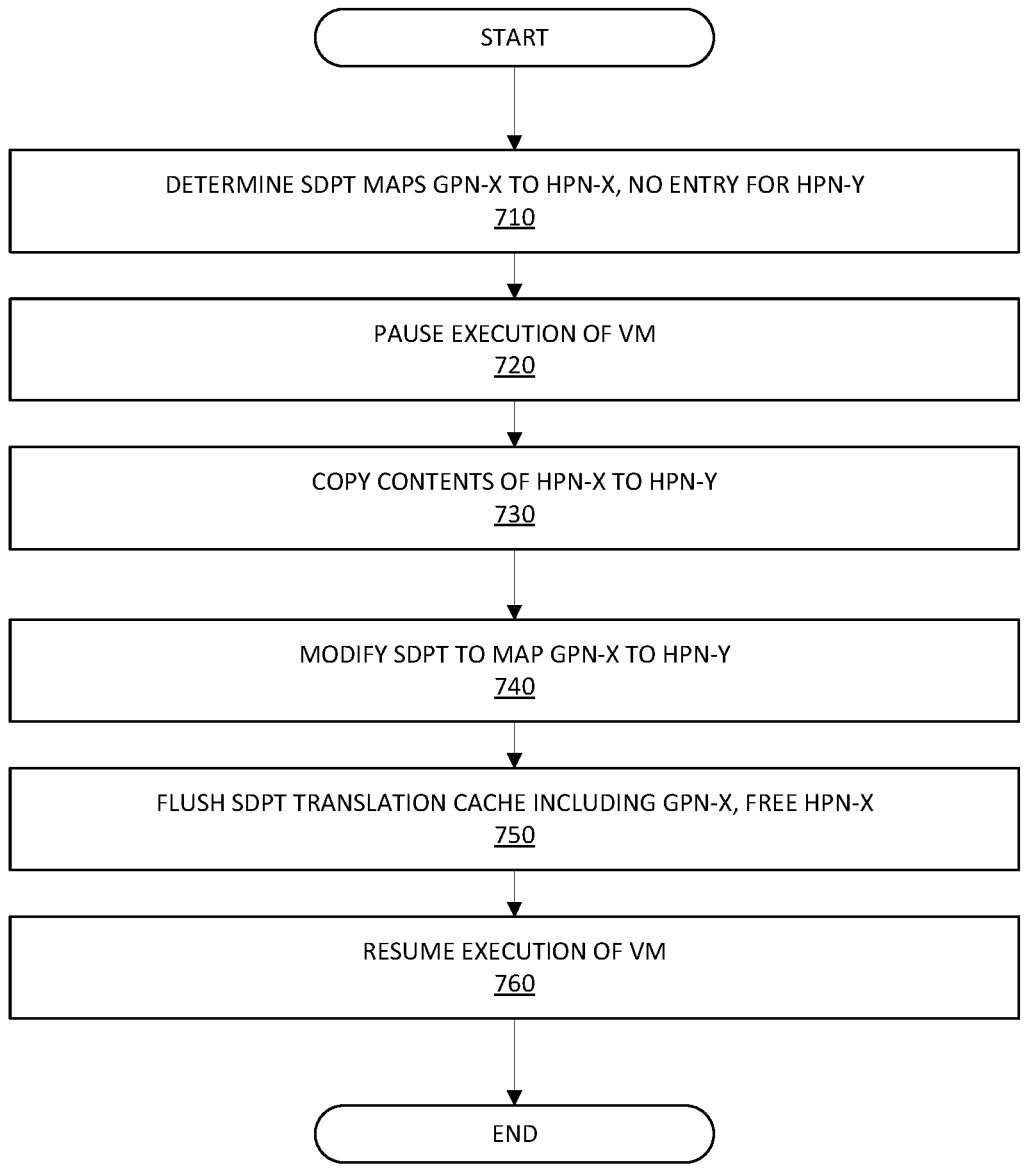
FIG. 7 illustrates an embodiment of a fifth logic flow.

FIG. 7 illustrates an embodiment of a logic flow 700. The logic flow 700 may be representative of some or all of the operations executed by one or more embodiments described herein. Embodiments are not limited in this context. For example, the caching component 115-1 of the VMM 108 may perform the logic flow 700 to migrate a hot guest memory page GPN-X in PMEM 113-$n$ with a target host memory page HPN-Y in the DRAM 113-1.

At block 710, the caching component 115-1 of the VMM 108 determines that the SDPT 118 for the corresponding VM 106 includes a translation entry which maps GPN-X to HPN-X, and does not include an entry for host memory page HPN-Y. At block 720, the caching component 115-1 of the VMM 108 temporarily pauses the execution of the corresponding VM 106 (and any associated OS 120 and/or applications 122). At block 730, the caching component 115-1 of the VMM 108 copies the contents of HPN-X to target host memory page HPN-Y. At block 740, the caching component 115-1 of the VMM 108 may modify the SDPT 118 for the VM 106 to map GPN-X to target host memory page HPN-Y in the DRAM 113-1. At block 750, the caching component 115-1 of the VMM 108 may flush the translation cache for the SDPT 118 (including any existing entries for GPN-X), and free HPN-X. At block 760, the caching component 115-1 of the VMM 108 may resume execution of the paused VM 106.

Figure 8:
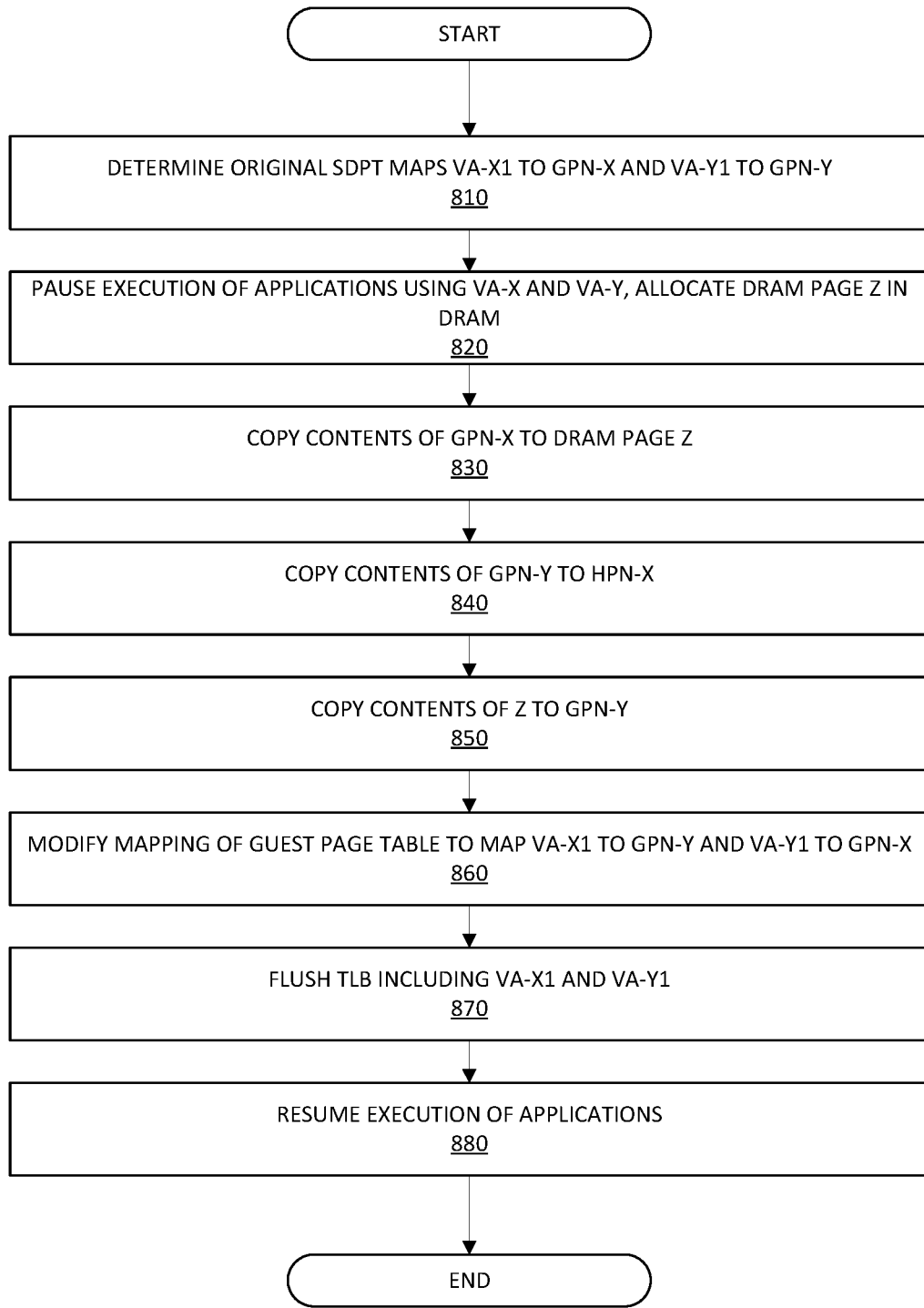
FIG. 8 illustrates an embodiment of a sixth logic flow.

FIG. 8 illustrates an embodiment of a logic flow 800. The logic flow 800 may be representative of some or all of the operations executed by one or more embodiments described herein. Embodiments are not limited in this context. For example, the caching component 115-$n$ of the VM 106-$n$ (and/or OS 120) may perform the logic flow 800 to migrate hot guest memory page GPN-X in PMEM 113-$n$ with target guest memory page GPN-Y in DRAM 113-1.

At block 810, the caching component 115-$n$ of one of the VMs 106 determines that the guest page table 121 of the OS 120 map virtual address VA-X1 (and optionally virtual addresses {VA-X2, VA-X3, . . . , VA-Xn}) to GPN-X and virtual address VA-Y1 (and optionally virtual addresses {VA-Y2, VA-Y3, . . . , VA-Yn}) to GPN-Y. At block 820, the caching component 115-$n$ of the VM 106-$n$ temporarily pauses the execution of any applications 120 using VA-X1 and VA-Y1, and allocates a page Z in the DRAM 113-1. At block 830, the caching component 115-$n$ of the VM 106-$n$ copies the contents of GPN-X to DRAM page Z. At block 840, the caching component 115-$n$ of the VM 106-$n$ copies the contents of GPN-Y to a host page HPN-X. At block 850, the caching component 115-$n$ of the VM 106-$n$ may then copy the contents of DRAM page Z to GPN-Y. At block 860, the caching component 115-$n$ of the VM 106-$n$ may modify the guest page table 121 to map {VA-X2, VA-X3, . . . , VA-Xn} to GPN-Y, and map {VA-Y2, VA-Y3, . . . , VA-Yn} to GPN-X. At block 870, the caching component 115-$n$ of the VM 106-$n$ may flush a translation lookaside buffer (TLB) of at least any existing entries for VA-X1 and VA-Y1. At block 880, the caching component 115-$n$ of the VM 106-$n$ may resume execution of the paused applications.

Figure 9:
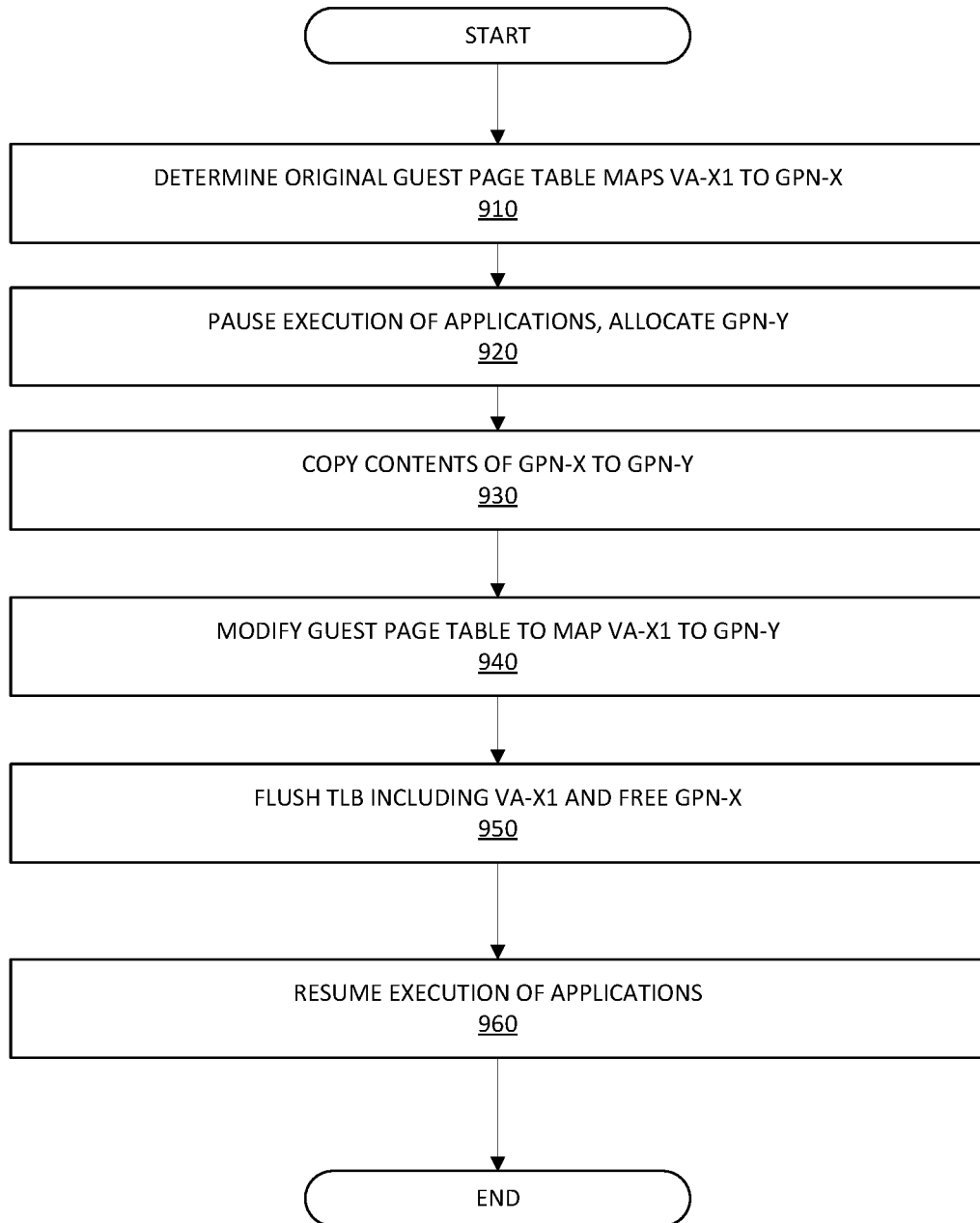
FIG. 9 illustrates an embodiment of a seventh logic flow.

FIG. 9 illustrates an embodiment of a logic flow 900. The logic flow 900 may be representative of some or all of the operations executed by one or more embodiments described herein. Embodiments are not limited in this context. For example, the caching component 115-$n$ of the VM 106-$n$ (and/or the OS 120) may perform the logic flow 900 to migrate GPN-X in PMEM 113-$n$ with a free target guest page GPN-Y in DRAM 113-1.

At block 910, the caching component 115-$n$ of the VM 106-$n$ may determine that the guest page table 121 maps virtual address VA-X1 (and optionally virtual addresses {VA-X2, VA-X3, . . . , VA-Xn}) to GPN-X. At block 920, the caching component 115-$n$ of the VM 106-$n$ may temporarily pause execution of the applications 122 using VA-X1, and allocate GPN-Y in the DRAM 113-1. At block 930, the caching component 115-$n$ of the VM 106-$n$ may copy the contents of GPN-X to GPN-Y. At block 940, the caching component 115-$n$ of the VM 106-$n$ may modify the guest page table 121 to map {VA-X2, VA-X3, . . . , VA-Xn} to GPN-Y. At block 950, the caching component 115-$n$ of the VM 106-$n$ may flush the TLB of any entries for VA-X1, and free GPN-X. At block 960, the caching component 115-$n$ of the VM 106-$n$ may resume execution of the paused applications 122.

Figure 10:
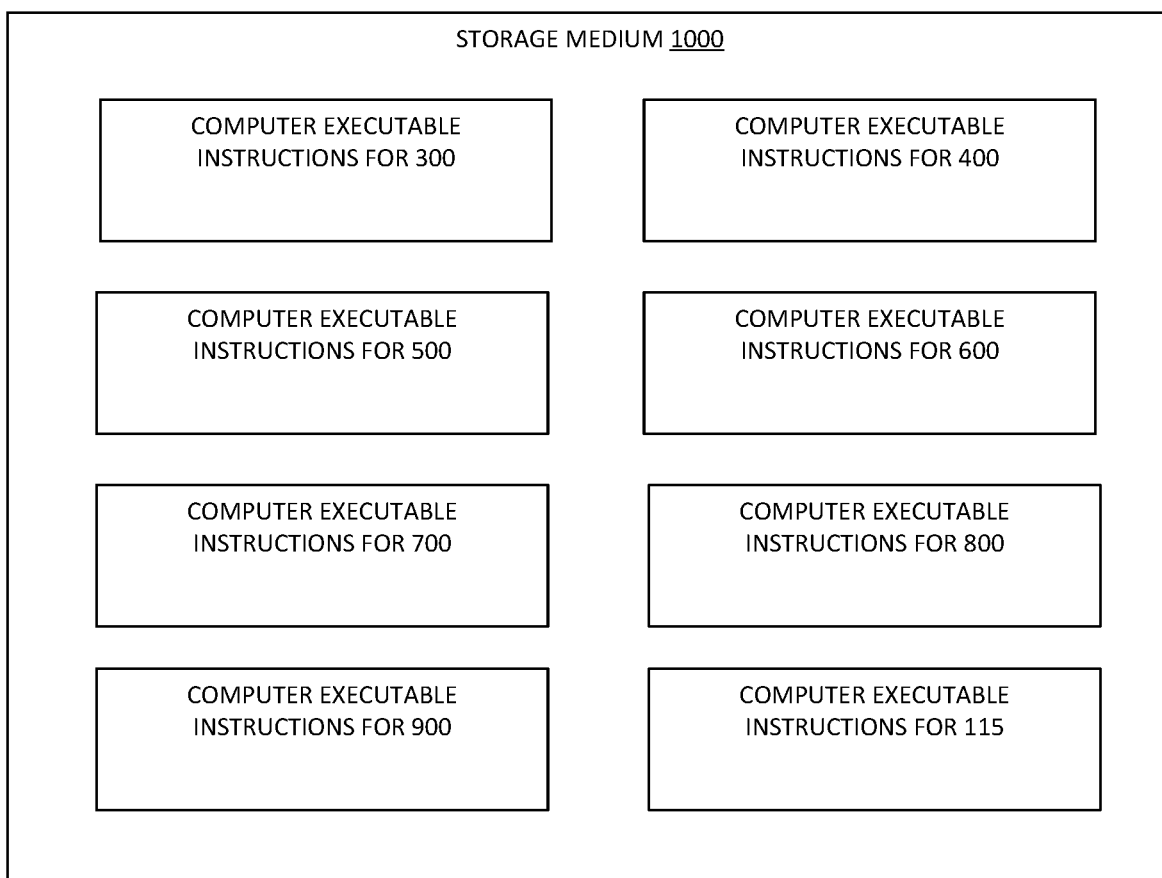
FIG. 10 illustrates an embodiment of a storage medium.

FIG. 10 illustrates an embodiment of a storage medium 1000. Storage medium 1000 may comprise any non-transitory computer-readable storage medium or machine-readable storage medium, such as an optical, magnetic or semiconductor storage medium. In various embodiments, storage medium 1000 may comprise an article of manufacture. In some embodiments, storage medium 1000 may store computer-executable instructions, such as computer-executable instructions to implement one or more of logic flows or operations described herein, such as with respect to 300, 400, 500, 600, 700, 800, 900 of FIGS. 3-9. The storage medium 1000 may further store computer-executable instructions for the caching component 115. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 11:
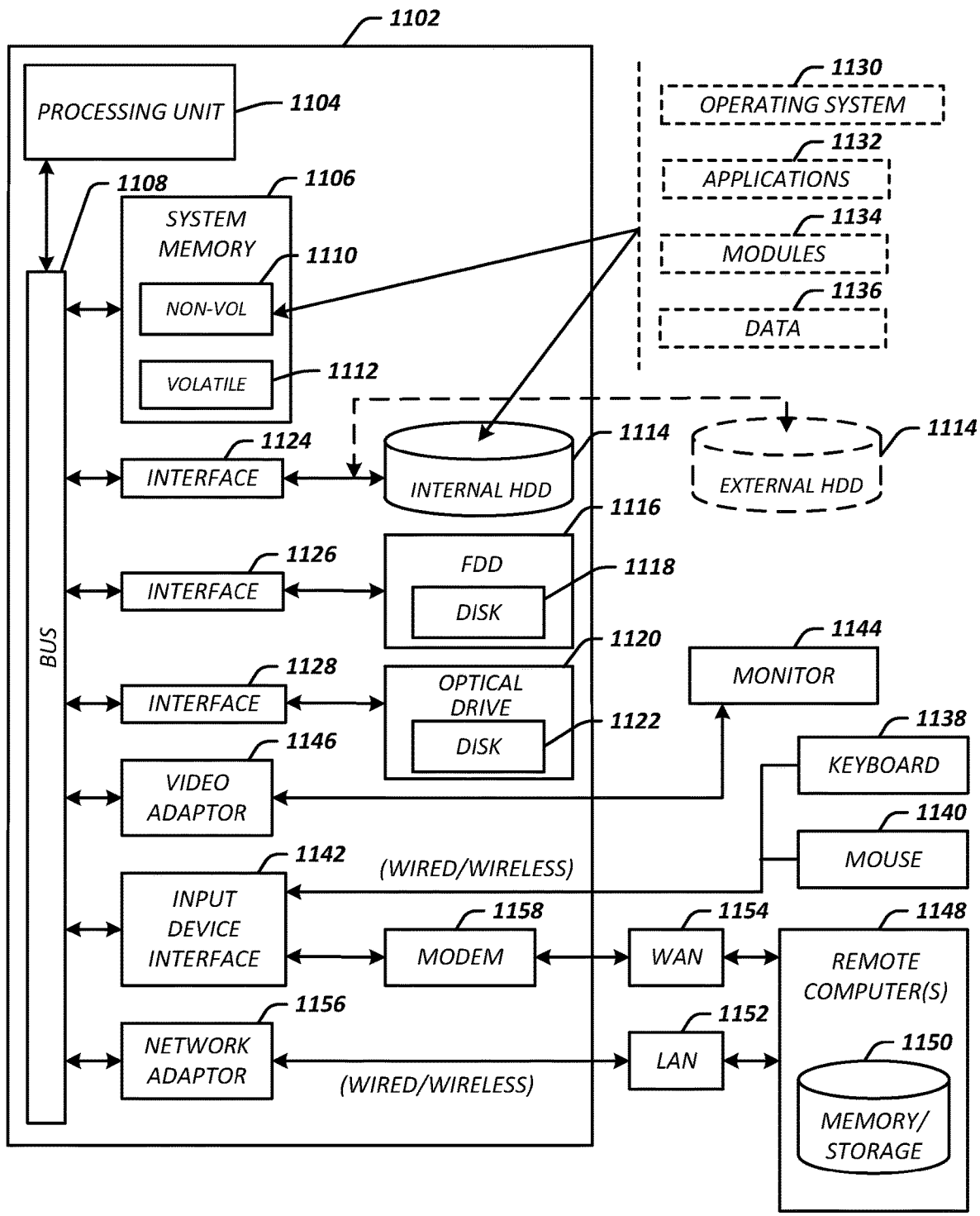
FIG. 11 illustrates an embodiment of a system.

FIG. 11 illustrates an embodiment of an exemplary computing architecture 1100 that may be suitable for implementing various embodiments as previously described. In various embodiments, the computing architecture 1100 may comprise or be implemented as part of an electronic device. In some embodiments, the computing architecture 1100 may be representative, for example, of a computer system that implements one or more components of operating environments 100, 200 of FIGS. 1 and 2A-2B. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), bulk byte-addressable persistent memory (PMEM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the caching component 115 and/or other logic described herein.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. In various embodiments, one or more migrations may occur via the networked environment. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The following examples pertain to further embodiments, from which numerous permutations and configurations will be apparent.

Example 1 is an apparatus comprising a processor and a memory storing instructions which when executed by the processor cause the processor to: identify a first guest memory page based at least in part on a number of accesses to a page table entry for the first guest memory page in a page table by an application executing in a virtual machine (VM) on the processor, the first guest memory page in a first byte-addressable memory of the apparatus; pause execution of the VM and the application on the processor; and migrate the first guest memory page to a target memory page in a second byte-addressable memory of the apparatus, the target memory page comprising one of a target host memory page and a target guest memory page, the second byte-addressable memory having an access speed faster than an access speed of the first byte-addressable memory.

Example 2 includes the subject matter of Example 1, the page table comprising an second-dimensional page table (SDPT) mapping guest physical memory addresses to host physical memory addresses, the instructions to identify the first guest memory page comprising instructions which when executed by the processor cause the processor to: clear an access bit for each of a plurality of entries in the SDPT, each entry in the SDPT corresponding to a respective guest memory page of a plurality of guest memory pages including the first guest memory page; wait a predefined amount of time; walk the SDPT; determine the access bit for the entry in the SDPT corresponding to the first guest memory page has been set; and increment an access counter value for the first guest memory page, the access counter value reflecting the number of accesses to the page table entry for the first guest memory page.

Example 3 includes the subject matter of example 2, the memory storing instructions which when executed by the processor cause the processor to: partition a memory space of the VM into a plurality of portions, the first guest memory page in a first portion of the plurality of portions of the memory space of the VM, the instructions to identify the first guest memory page performed for the first portion of the memory space of the VM.

Example 4 includes the subject matter of example 3, the first guest memory page further identified based on a migration policy specifying to migrate a plurality of guest memory pages including the first guest memory page, the instructions to identify the first guest memory page comprising instructions which when executed by the processor cause the processor to: determine an access counter value for each of the plurality of guest memory pages; and determine the plurality of guest memory pages based on the plurality of guest memory pages having the greatest relative access counter values.

Example 5 includes the subject matter of example 2, the target memory page comprising the target guest memory page in the second byte-addressable memory, the instructions to migrate the first guest memory page comprising instructions for a virtual machine monitor (VMM) which when executed by the processor cause the processor to: determine that the SDPT maps the first guest memory page to a first host memory page; determine that the SDPT maps the target guest memory page to a second host memory page; copy the first host memory page to a temporary memory page in the second byte-addressable memory; copy the second host memory page to the first host memory page; copy the temporary memory page in the second byte-addressable memory to the second host memory page; modify the SDPT to map: (i) the first guest memory page to the first host memory page, and (ii) the target guest memory page to the second host memory page; flush a translation cache of the SDPT; and resume execution of the VM and the application.

Example 6 includes the subject matter of example 2, the target memory page comprising the target host memory page in the second byte-addressable memory, the instructions to migrate the first guest memory page comprising instructions for a virtual machine monitor (VMM) which when executed by the processor cause the processor to: determine that the SDPT maps the first guest memory page to a first host memory page; copy the first guest memory page to the target host memory page; modify the SDPT to map the first guest memory page to the target host memory page; free the first host memory page; flush a translation cache of the SDPT; and resume execution of the VM and the application.

Example 7 includes the subject matter of example 1, the page table comprising a guest page table of the VM, the target memory page comprising the target guest memory page in the second byte-addressable memory, the VM comprising the instructions to migrate the first guest memory page, the instructions to migrate the first guest memory page executable by the processor to cause the processor to: determine that the guest page table maps a first virtual address to the first guest memory page and maps a second virtual address to the target guest memory page; allocate a temporary memory page in the second byte-addressable memory; copy the first guest memory page to the temporary memory page; copy the target guest memory page to a first host memory page; copy the temporary memory page to the target guest memory page; modify the guest page table to map the first virtual address to the target guest memory page; free the first guest memory page; flush a translation lookaside buffer (TLB) of an entry for the first guest memory page; and resume execution of the VM and the application.

Example 8 includes the subject matter of example 1, the page table comprising a guest page table of the VM, the target memory page comprising the target guest memory page in the second byte-addressable memory, the VM comprising the instructions to migrate the first guest memory page, the instructions to migrate the first guest memory page executable by the processor to cause the processor to: determine that the guest page table maps a first virtual address to the first guest memory page; allocate the target guest memory page in the second byte-addressable memory; copy the first guest memory page to the target guest memory page; modify the guest page table to map the first virtual address to the target guest memory page; flush a translation lookaside buffer (TLB) of an entry for the first guest memory page; and resume execution of the VM and the application.

Example 9 includes the subject matter of examples 1-8, the first byte-addressable memory comprising a persistent memory (PMEM) implemented in a non-volatile dual in-line memory module, the second byte-addressable memory comprising a dynamic random access memory (DRAM), the access speeds of the PMEM and the DRAM relative to the processor.

Example 10 is non-transitory computer-readable storage medium comprising instructions that when executed by a processor of a computing device, cause the processor to: identify a first guest memory page based at least in part on a number of accesses to a page table entry for the first guest memory page in a page table by an application executing in a virtual machine (VM) on the processor, the first guest memory page in a first byte-addressable memory of the computing device; pause execution of the VM and the application on the processor; and migrate the first guest memory page to a target memory page in a second byte-addressable memory of the computing device, the target memory page comprising one of a target host memory page and a target guest memory page, the second byte-addressable memory having an access speed faster than an access speed of the first byte-addressable memory.

Example 11 includes the subject matter of example 10, the page table comprising an second-dimensional page table (SDPT) mapping guest physical memory addresses to host physical memory addresses, further comprising instructions executable by the processor to cause the processor to: clear an access bit for each of a plurality of entries in the SDPT, each entry in the SDPT corresponding to a respective guest memory page of a plurality of guest memory pages including the first guest memory page; wait a predefined amount of time; walk the SDPT; determine the access bit for the entry in the SDPT corresponding to the first guest memory page has been set; and increment an access counter for the first guest memory page, increment an access counter value for the first guest memory page, the access counter value reflecting the number of accesses to the page table entry for the first guest memory page.

Example 12 includes the subject matter of example 11, further comprising instructions executable by the processor to cause the processor to: partition a memory space of the VM into a plurality of portions, the first guest memory page in a first portion of the plurality of portions of the memory space of the VM, the instructions to identify the first guest memory page performed for the first portion of the memory space of the VM.

Example 13 includes the subject matter of example 12, the first guest memory page further identified based on a migration policy specifying to migrate a plurality of guest memory pages including the first guest memory page, further comprising instructions executable by the processor to cause the processor to: determine an access counter value for each of the plurality of guest memory pages; and determine the plurality of guest memory pages based on the plurality of guest memory pages having the greatest relative access counter values.

Example 14 includes the subject matter of example 11, the target memory page comprising the target guest memory page in the second byte-addressable memory, further comprising instructions for a virtual machine monitor (VMM) executable by the processor to cause the processor to: determine that the SDPT maps the first guest memory page to a first host memory page; determine that the SDPT maps the target guest memory page to a second host memory page; copy the first host memory page to a temporary memory page in the second byte-addressable memory; copy the second host memory page to the first host memory page; copy the temporary memory page in the second byte-addressable memory to the second host memory page; modify the SDPT to map: (i) the first guest memory page to the first host memory page, and (ii) the target guest memory page to the second host memory page; flush a translation cache of the SDPT; and resume execution of the VM and the application.

Example 15 includes the subject matter of example 11, the target memory page comprising the target host memory page in the second byte-addressable memory, further comprising instructions for a virtual machine monitor (VMM) executable by the processor to cause the processor to: determine that the SDPT maps the first guest memory page to a first host memory page; copy the first guest memory page to the target host memory page; modify the SDPT to map the first guest memory page to the target host memory page; free the first host memory page; flush a translation cache of the SDPT; and resume execution of the VM and the application.

Example 16 includes the subject matter of example 10, the page table comprising a guest page table of the VM, the target memory page comprising the target guest memory page in the second byte-addressable memory, the VM comprising the instructions to migrate the first guest memory page, the instructions to migrate the first guest memory page executable by the processor to cause the processor to: determine that the guest page table maps a first virtual address to the first guest memory page and maps a second virtual address to the target guest memory page; allocate a temporary memory page in the second byte-addressable memory; copy the first guest memory page to the temporary memory page; copy the target guest memory page to a first host memory page; copy the temporary memory page to the target guest memory page; modify the guest page table to map the first virtual address to the target guest memory page; free the first guest memory page; flush a translation lookaside buffer (TLB) of an entry for the first guest memory page; and resume execution of the VM and the application.

Example 17 includes the subject matter of example 10, the page table comprising a guest page table of the VM, the target memory page comprising the target guest memory page in the second byte-addressable memory, the VM comprising the instructions to migrate the first guest memory page, the instructions to migrate the first guest memory page executable by the processor to cause the processor to: determine that the guest page table maps a first virtual address to the first guest memory page; allocate the target guest memory page in the second byte-addressable memory; copy the first guest memory page to the target guest memory page; modify the guest page table to map the first virtual address to the target guest memory page; flush a translation lookaside buffer (TLB) of an entry for the first guest memory page; and resume execution of the VM and the application.

Example 18 includes the subject matter of examples 10-17, the first byte-addressable memory comprising a persistent memory (PMEM) implemented in a non-volatile dual in-line memory module, the second byte-addressable memory comprising a dynamic random access memory (DRAM), the access speeds of the PMEM and the DRAM relative to the processor.

Example 19 is a method, comprising: identifying a first guest memory page based at least in part on a number of accesses to a page table entry for the first guest memory page in a page table by an application executing in a virtual machine (VM) on the processor, the first guest memory page in a first byte-addressable memory; pausing execution of the VM and the application on the processor; and migrating the first guest memory page to a target memory page in a second byte-addressable memory, the target memory page comprising one of a target host memory page and a target guest memory page, the second byte-addressable memory having an access speed faster than an access speed of the first byte-addressable memory.

Example 20 includes the subject matter of example 19, the page table comprising an second-dimensional page table (SDPT) mapping guest physical memory addresses to host physical memory addresses, the method further comprising: clearing an access bit for each of a plurality of entries in the SDPT, each entry in the SDPT corresponding to a respective guest memory page of a plurality of guest memory pages including the first guest memory page; waiting a predefined amount of time; walking the SDPT; determining the access bit for the entry in the SDPT corresponding to the first guest memory page has been set; and incrementing an access counter for the first guest memory page, the access counter value reflecting the number of accesses to the first guest memory page.

Example 21 includes the subject matter of example 20, the first guest memory page further identified based on a migration policy specifying to migrate a plurality of guest memory pages including the first guest memory page, the method further comprising: partitioning a memory space of the VM into a plurality of portions, the first guest memory page in a first portion of the plurality of portions of the memory space of the VM, the instructions to identify the first guest memory page performed for the first portion of the memory space of the VM.

Example 22 includes the subject matter of example 21, the first guest memory page further identified based on a migration policy specifying to migrate a plurality of guest memory pages including the first guest memory page, the method further comprising: determining an access counter value for each of the plurality of guest memory pages; and determining the plurality of guest memory pages based on the plurality of guest memory pages having the greatest relative access counter values.

Example 23 includes the subject matter of example 20, the target memory page comprising the target guest memory page in the second byte-addressable memory, the method further comprising: determining, by a virtual machine monitor (VMM) executing on the processor, that the SDPT maps the first guest memory page to a first host memory page; determining, by the VMM, that the SDPT maps the target guest memory page to a second host memory page; copying, by the VMM, the first host memory page to a temporary memory page in the second byte-addressable memory; copying, by the VMM, the second host memory page to the first host memory page; copying, by the VMM, the temporary memory page in the second byte-addressable memory to the second host memory page; modifying, by the VMM, the SDPT to map: (i) the first guest memory page to the first host memory page, and (ii) the target guest memory page to the second host memory page; flushing, by the VMM, a translation cache of the SDPT; and resuming, by the VMM, execution of the VM and the application.

Example 24 includes the subject matter of example 20, the target memory page comprising the target host memory page in the second byte-addressable memory, the method further comprising: determining, by a virtual machine monitor (VMM) executing on the processor, that the SDPT maps the first guest memory page to a first host memory page; copying, by the VMM, the first guest memory page to the target host memory page; modifying, by the VMM, the SDPT to map the first guest memory page to the target host memory page; freeing, by the VMM, the first host memory page; flushing, by the VMM, a translation cache of the SDPT; and resuming, by the VMM, execution of the VM and the application.

Example 25 includes the subject matter of example 19, the page table comprising a guest page table of the VM, the target memory page comprising the target guest memory page in the second byte-addressable memory, the method further comprising: determining, by the VM, that the guest page table maps a first virtual address to the first guest memory page and maps a second virtual address to the target guest memory page; allocating, by the VM, a temporary memory page in the second byte-addressable memory; copying, by the VM, the first guest memory page to the temporary memory page; copying, by the VM, the target guest memory page to a first host memory page; copying, by the VM, the temporary memory page to the target guest memory page; modify the guest page table to map the first virtual address to the target guest memory page; freeing, by the VM, the first guest memory page; flushing, by the VM, a translation lookaside buffer (TLB) of an entry for the first guest memory page; and resuming execution of the VM and the application by the VM.

Example 26 includes the subject matter of example 19, the page table comprising a guest page table of the VM, the target memory page comprising the target guest memory page in the second byte-addressable memory, the method further comprising: determining, by the VM, that the guest page table maps a first virtual address to the first guest memory page; allocating, by the VM, the target guest memory page in the second byte-addressable memory; copying, by the VM, the first guest memory page to the target guest memory page; modifying, by the VM, the guest page table to map the first virtual address to the target guest memory page; flushing, by the VM, a translation lookaside buffer (TLB) of an entry for the first guest memory page; and resume execution of the VM and the application by the VM.

Example 27 includes the subject matter of examples 19-26, the first byte-addressable memory comprising a persistent memory (PMEM) implemented in a non-volatile dual in-line memory module, the second byte-addressable memory comprising a dynamic random access memory (DRAM), the access speeds of the PMEM and the DRAM relative to the processor.

Example 28 is an apparatus, comprising: means for identifying a first guest memory page in a page table based at least in part on a number of accesses to the first guest memory page in a page table by an application executing in a virtual machine (VM) on the processor, the first guest memory page corresponding to a first byte-addressable memory of the apparatus; means for pausing execution of the VM and the application on the processor; and means for migrating the first guest memory page to a target memory page corresponding to a second byte-addressable memory of the apparatus, the target memory page comprising one of a target host memory page and a target guest memory page, the second byte-addressable memory having an access speed faster than an access speed of the first byte-addressable memory.

Example 29 includes the subject matter of example 28, the page table comprising an second-dimensional page table (SDPT) mapping guest physical memory addresses to host physical memory addresses, the apparatus further comprising: means for clearing an access bit for each of a plurality of entries in the SDPT, each entry in the SDPT corresponding to a respective guest memory page of a plurality of guest memory pages including the first guest memory page; means for waiting a predefined amount of time; means for walking the SDPT; means for determining the access bit for the entry in the SDPT corresponding to the first guest memory page has been set; and means for incrementing an access counter for the first guest memory page, the access counter reflecting the number of accesses to the first guest memory page.

Example 30 includes the subject matter of example 29, the first guest memory page further identified based on a migration policy specifying to migrate a plurality of guest memory pages including the first guest memory page, the apparatus further comprising: means for partitioning a memory space of the VM into a plurality of portions, the first guest memory page in a first portion of the plurality of portions of the memory space of the VM, the instructions to identify the first guest memory page performed for the first portion of the memory space of the VM.

Example 31 includes the subject matter of example 30, the first guest memory page further identified based on a migration policy specifying to migrate a plurality of guest memory pages including the first guest memory page, the apparatus further comprising: means for determining an access counter value for each of the plurality of guest memory pages; and means for determining the plurality of guest memory pages based on the plurality of guest memory pages having the greatest relative access counter values.

Example 32 includes the subject matter of example 29, the target memory page comprising the target guest memory page in the second byte-addressable memory, the apparatus further comprising: means for determining, by a virtual machine monitor (VMM) executing on the processor, that the SDPT maps the first guest memory page to a first host memory page; means for determining, by the VMM, that the SDPT maps the target guest memory page to a second host memory page; means for copying, by the VMM, the first host memory page to a temporary memory page in the second byte-addressable memory; means for copying, by the VMM, the second host memory page to the first host memory page; means for copying, by the VMM, the temporary memory page in the second byte-addressable memory to the second host memory page; means for modifying, by the VMM, the SDPT to map: (i) the first guest memory page to the first host memory page, and (ii) the target guest memory page to the second host memory page; means for flushing, by the VMM, a translation cache of the SDPT; and means for resuming, by the VMM, execution of the VM and the application.

Example 33 includes the subject matter of example 29, the target memory page comprising the target host memory page in the second byte-addressable memory, the apparatus further comprising: means for determining, by a virtual machine monitor (VMM) executing on the processor, that the SDPT maps the first guest memory page to a first host memory page; means for copying, by the VMM, the first guest memory page to the target host memory page; means for modifying, by the VMM, the SDPT to map the first guest memory page to the target host memory page; means for freeing, by the VMM, the first host memory page; means for flushing, by the VMM, a translation cache of the SDPT; and means for resuming, by the VMM, execution of the VM and the application.

Example 34 includes the subject matter of example 28, the page table comprising a guest page table of the VM, the target memory page comprising the target guest memory page in the second byte-addressable memory, the apparatus further comprising: means for determining, by the VM, that the guest page table maps a first virtual address to the first guest memory page and maps a second virtual address to the target guest memory page; means for allocating, by the VM, a temporary memory page in the second byte-addressable memory; means for copying, by the VM, the first guest memory page to the temporary memory page; means for copying, by the VM, the target guest memory page to a first host memory page; means for copying, by the VM, the temporary memory page to the target guest memory page; means for modify the guest page table to map the first virtual address to the target guest memory page; means for freeing, by the VM, the first guest memory page; means for flushing, by the VM, a translation lookaside buffer (TLB) of an entry for the first guest memory page; and means for resuming execution of the VM and the application by the VM.

Example 35 includes the subject matter of example 28, the page table comprising a guest page table of the VM, the target memory page comprising the target guest memory page in the second byte-addressable memory, the apparatus further comprising: means for determining, by the VM, that the guest page table maps a first virtual address to the first guest memory page; means for allocating, by the VM, the target guest memory page in the second byte-addressable memory; means for copying, by the VM, the first guest memory page to the target guest memory page; means for modifying, by the VM, the guest page table to map the first virtual address to the target guest memory page; means for flushing, by the VM, a translation lookaside buffer (TLB) of an entry for the first guest memory page; and means for resume execution of the VM and the application by the VM.

Example 36 includes the subject matter of examples 28-35, the first byte-addressable memory comprising a persistent memory (PMEM) implemented in a non-volatile dual in-line memory module, the second byte-addressable memory comprising a dynamic random access memory (DRAM), the access speeds of the PMEM and the DRAM relative to the processor.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An apparatus, comprising:
a processor; and
a memory storing instructions which when executed by the processor cause the processor to:
   identify a first guest memory page based at least in part on a number of accesses to a page table entry for the first guest memory page by an application executing in a virtual machine (VM) on the processor, the first guest memory page in a byte-addressable persistent memory (PMEM) of the apparatus;
   pause execution of the VM and the application on the processor; and
   migrate the first guest memory page to a target memory page in a dynamic random access memory (DRAM) of the apparatus, the target memory page comprising one of a target host memory page and a target guest memory page, the DRAM having an access speed faster than an access speed of the PMEM.

2. The apparatus of claim 1, the page table comprising an extended page table (EPT) mapping guest virtual memory addresses to guest physical memory addresses, the instructions to identify the first guest memory page comprising instructions which when executed by the processor cause the processor to:
   clear an access bit for each of a plurality of entries in the EPT, each entry in the EPT corresponding to a respective guest memory page of a plurality of guest memory pages including the first guest memory page;
   wait a predefined amount of time;
   walk the EPT;
   determine the access bit for the entry in the EPT corresponding to the first guest memory page has been set; and
   increment an access counter value for the first guest memory page, the access counter value reflecting the number of accesses to the page table entry for the first guest memory page.

3. The apparatus of claim 2, the memory storing instructions which when executed by the processor cause the processor to:
   partition a memory space of the VM into a plurality of portions, the first guest memory page in a first portion of the plurality of portions of the memory space of the VM, the instructions to identify the first guest memory page performed for the first portion of the memory space of the VM.

4. The apparatus of claim 3, the first guest memory page further identified based on a migration policy specifying to migrate a plurality of guest memory pages including the first guest memory page, the instructions to identify the first guest memory page comprising instructions which when executed by the processor cause the processor to:
   determine an access counter value for each of the plurality of guest memory pages; and
   determine the plurality of guest memory pages based on the plurality of guest memory pages having the greatest relative access counter values.

5. The apparatus of claim 2, the target memory page comprising the target guest memory page in the DRAM, the instructions to migrate the first guest memory page comprising instructions for a virtual machine monitor (VMM) which when executed by the processor cause the processor to:
   determine that the EPT maps the first guest memory page to a first host memory page;
   determine that the EPT maps the target guest memory page to a second host memory page;
   copy the first host memory page to a temporary memory page in the DRAM;
   copy the second host memory page to the first host memory page;
   copy the temporary memory page in the DRAM to the second host memory page;
   modify the EPT to map: (i) the first guest memory page to the first host memory page, and (ii) the target guest memory page to the second host memory page;
   flush a translation cache of the EPT; and
   resume execution of the VM and the application.

6. The apparatus of claim 2, the target memory page comprising the target host memory page in the DRAM, the instructions to migrate the first guest memory page comprising instructions for a virtual machine monitor (VMM) which when executed by the processor cause the processor to:
   determine that the EPT maps the first guest memory page to a first host memory page;

copy the first guest memory page to the target host memory page;
modify the EPT to map the first guest memory page to the target host memory page;
free the first host memory page;
flush a translation cache of the EPT; and
resume execution of the VM and the application.

7. The apparatus of claim 1, the page table comprising a guest page table of the VM, the target memory page comprising the target guest memory page in the DRAM, the VM comprising the instructions to migrate the first guest memory page, the instructions to migrate the first guest memory page executable by the processor to cause the processor to:
determine that the guest page table maps a first virtual address to the first guest memory page and maps a second virtual address to the target guest memory page;
allocate a temporary memory page in the DRAM;
copy the first guest memory page to the temporary memory page;
copy the target guest memory page to a first host memory page;
copy the temporary memory page to the target guest memory page;
modify the guest page table to map the first virtual address to the target guest memory page;
free the first guest memory page;
flush a translation lookaside buffer (TLB) of an entry for the first guest memory page; and
resume execution of the VM and the application.

8. The apparatus of claim 1, the page table comprising a guest page table of the VM, the target memory page comprising the target guest memory page in the DRAM, the VM comprising the instructions to migrate the first guest memory page, the instructions to migrate the first guest memory page executable by the processor to cause the processor to:
determine that the guest page table maps a first virtual address to the first guest memory page;
allocate the target guest memory page in the DRAM;
copy the first guest memory page to the target guest memory page;
modify the guest page table to map the first virtual address to the target guest memory page;
flush a translation lookaside buffer (TLB) of an entry for the first guest memory page; and
resume execution of the VM and the application.

9. The apparatus of claim 1, the PMEM implemented in a non-volatile dual in-line memory module, the access speeds of the PMEM and the DRAM relative to the processor.

10. A non-transitory computer-readable storage medium comprising instructions that when executed by a processor of a computing device, cause the processor to:
identify a first guest memory page based at least in part on a number of accesses to a page table entry for the first guest memory page by an application executing in a virtual machine (VM) on the processor, the first guest memory page in a byte-addressable persistent memory (PMEM) of the computing device;
pause execution of the VM and the application on the processor; and
migrate the first guest memory page to a target memory page in a dynamic random access memory (DRAM) of the computing device, the target memory page comprising one of a target host memory page and a target guest memory page, the DRAM having an access speed faster than an access speed of the PMEM.

11. The non-transitory computer-readable storage medium of claim 10, the page table comprising an extended page table (EPT) mapping guest virtual memory addresses to guest physical memory addresses, further comprising instructions executable by the processor to cause the processor to:
clear an access bit for each of a plurality of entries in the EPT, each entry in the EPT corresponding to a respective guest memory page of a plurality of guest memory pages including the first guest memory page;
wait a predefined amount of time;
walk the EPT;
determine the access bit for the entry in the EPT corresponding to the first guest memory page has been set; and
increment an access counter value for the first guest memory page, the access counter value reflecting the number of accesses to the page table entry for the first guest memory page.

12. The non-transitory computer-readable storage medium of claim 11, further comprising instructions executable by the processor to cause the processor to:
partition a memory space of the VM into a plurality of portions, the first guest memory page in a first portion of the plurality of portions of the memory space of the VM, the instructions to identify the first guest memory page performed for the first portion of the memory space of the VM.

13. The non-transitory computer-readable storage medium of claim 12, the first guest memory page further identified based on a migration policy specifying to migrate a plurality of guest memory pages including the first guest memory page, further comprising instructions executable by the processor to cause the processor to:
determine an access counter value for each of the plurality of guest memory pages; and
determine the plurality of guest memory pages based on the plurality of guest memory pages having the greatest relative access counter values.

14. The non-transitory computer-readable storage medium of claim 11, the target memory page comprising the target guest memory page in the DRAM, further comprising instructions for a virtual machine monitor (VMM) executable by the processor to cause the processor to:
determine that the EPT maps the first guest memory page to a first host memory page;
determine that the EPT maps the target guest memory page to a second host memory page;
copy the first host memory page to a temporary memory page in the DRAM;
copy the second host memory page to the first host memory page;
copy the temporary memory page in the DRAM to the second host memory page;
modify the EPT to map: (i) the first guest memory page to the first host memory page, and (ii) the target guest memory page to the second host memory page;
flush a translation cache of the EPT; and
resume execution of the VM and the application.

15. The non-transitory computer-readable storage medium of claim 11, the target memory page comprising the target host memory page in the DRAM, further comprising instructions for a virtual machine monitor (VMM) executable by the processor to cause the processor to:

determine that the EPT maps the first guest memory page to a first host memory page;
copy the first guest memory page to the target host memory page;
modify the EPT to map the first guest memory page to the target host memory page;
free the first host memory page;
flush a translation cache of the EPT; and
resume execution of the VM and the application.

16. The non-transitory computer-readable storage medium of claim 10, the page table comprising a guest page table of the VM, the target memory page comprising the target guest memory page in the DRAM, the VM comprising the instructions to migrate the first guest memory page, the instructions to migrate the first guest memory page executable by the processor to cause the processor to:
determine that the guest page table maps a first virtual address to the first guest memory page and maps a second virtual address to the target guest memory page;
allocate a temporary memory page in the DRAM;
copy the first guest memory page to the temporary memory page;
copy the target guest memory page to a first host memory page;
copy the temporary memory page to the target guest memory page;
modify the guest page table to map the first virtual address to the target guest memory page;
free the first guest memory page;
flush a translation lookaside buffer (TLB) of an entry for the first guest memory page; and
resume execution of the VM and the application.

17. The non-transitory computer-readable storage medium of claim 10, the page table comprising a guest page table of the VM, the target memory page comprising the target guest memory page in the DRAM, the VM comprising the instructions to migrate the first guest memory page, the instructions to migrate the first guest memory page executable by the processor to cause the processor to:
determine that the guest page table maps a first virtual address to the first guest memory page;
allocate the target guest memory page in the DRAM;
copy the first guest memory page to the target guest memory page;
modify the guest page table to map the first virtual address to the target guest memory page;
flush a translation lookaside buffer (TLB) of an entry for the first guest memory page; and
resume execution of the VM and the application.

18. The non-transitory computer-readable storage medium of claim 10, the PMEM implemented in a non-volatile dual in-line memory module, the access speeds of the PMEM and the DRAM relative to the processor.

19. A method, comprising:
identifying a first guest memory page based at least in part on a number of accesses to a page table entry for the first guest memory page by an application executing in a virtual machine (VM) on the processor, the first guest memory page in a byte-addressable persistent memory (PMEM);
pausing execution of the VM and the application on the processor; and
migrating the first guest memory page to a target memory page in a dynamic random access memory (DRAM), the target memory page comprising one of a target host memory page and a target guest memory page, the DRAM having an access speed faster than an access speed of the PMEM.

20. The method of claim 19, the page table comprising an extended page table (EPT) mapping guest virtual memory addresses to guest physical memory addresses, the method further comprising:
clearing an access bit for each of a plurality of entries in the EPT, each entry in the EPT corresponding to a respective guest memory page of a plurality of guest memory pages including the first guest memory page;
waiting a predefined amount of time;
walking the EPT;
determining the access bit for the entry in the EPT corresponding to the first guest memory page has been set; and
incrementing an access counter for the first guest memory page, the access counter value reflecting the number of accesses to the first guest memory page.

21. The method of claim 20, further comprising:
partitioning a memory space of the VM into a plurality of portions, the first guest memory page in a first portion of the plurality of portions of the memory space of the VM, the instructions to identify the first guest memory page performed for the first portion of the memory space of the VM.

22. The method of claim 21, the first guest memory page further identified based on a migration policy specifying to migrate a plurality of guest memory pages including the first guest memory page, the method further comprising:
determining an access counter value for each of the plurality of guest memory pages; and
determining the plurality of guest memory pages based on the plurality of guest memory pages having the greatest relative access counter values.

23. The method of claim 20, the target memory page comprising the target guest memory page in the DRAM, the method further comprising:
determining, by a virtual machine monitor (VMM) executing on the processor, that the EPT maps the first guest memory page to a first host memory page;
determining, by the VMM, that the EPT maps the target guest memory page to a second host memory page;
copying, by the VMM, the first host memory page to a temporary memory page in the DRAM;
copying, by the VMM, the second host memory page to the first host memory page;
copying, by the VMM, the temporary memory page in the DRAM to the second host memory page;
modifying, by the VMM, the EPT to map: (i) the first guest memory page to the first host memory page, and (ii) the target guest memory page to the second host memory page;
flushing, by the VMM, a translation cache of the EPT; and
resuming, by the VMM, execution of the VM and the application.

24. The method of claim 20, the target memory page comprising the target host memory page in the DRAM, the method further comprising:
determining, by a virtual machine monitor (VMM) executing on the processor, that the EPT maps the first guest memory page to a first host memory page;
copying, by the VMM, the first guest memory page to the target host memory page;
modifying, by the VMM, the EPT to map the first guest memory page to the target host memory page;
freeing, by the VMM, the first host memory page;

flushing, by the VMM, a translation cache of the EPT; and
resuming, by the VMM, execution of the VM and the application.

25. The method of claim 19, the page table comprising a guest page table of the VM, the target memory page comprising the target guest memory page in the DRAM, the method further comprising:
- determining, by the VM, that the guest page table maps a first virtual address to the first guest memory page and maps a second virtual address to the target guest memory page;
- allocating, by the VM, a temporary memory page in the DRAM;
- copying, by the VM, the first guest memory page to the temporary memory page;
- copying, by the VM, the target guest memory page to a first host memory page;
- copying, by the VM, the temporary memory page to the target guest memory page;
- modify the guest page table to map the first virtual address to the target guest memory page;
- freeing, by the VM, the first guest memory page;
- flushing, by the VM, a translation lookaside buffer (TLB) of an entry for the first guest memory page; and
- resuming execution of the VM and the application by the VM.

* * * * *